United States Patent [19]

Beckwith et al.

[11] Patent Number: 4,489,389
[45] Date of Patent: Dec. 18, 1984

[54] REAL TIME VIDEO PERSPECTIVE DIGITAL MAP DISPLAY

[75] Inventors: Paul B. Beckwith, Indialantic; Kent P. Bascle; Jeffrey B. Pearce, both of Melbourne, all of Fla.

[73] Assignee: Harris Corporation, Melbourne, Fla.

[21] Appl. No.: 308,166

[22] Filed: Oct. 2, 1981

[51] Int. Cl.³ ................. G06F 3/153; H04N 7/18
[52] U.S. Cl. .................... 364/522; 358/103; 364/518; 364/731
[58] Field of Search ........... 364/521, 522, 518, 731; 358/103

[56] References Cited

U.S. PATENT DOCUMENTS

| 3,418,459 | 12/1968 | Purdy et al. | 364/522 |
|---|---|---|---|
| 3,602,702 | 8/1971 | Warnock | 364/522 |
| 3,899,662 | 8/1975 | Kreeger et al. | 364/522 |
| 4,071,895 | 1/1978 | Wood et al. | 358/103 X |
| 4,086,632 | 4/1978 | Lions | 364/521 X |
| 4,138,726 | 2/1979 | Girault et al. | 364/521 |
| 4,152,766 | 5/1979 | Osofsky et al. | 364/522 |
| 4,181,956 | 1/1980 | Schwab et al. | 364/521 |
| 4,240,108 | 12/1980 | Levy | 358/103 |
| 4,340,878 | 7/1982 | Spooner et al. | 358/103 X |
| 4,360,876 | 11/1982 | Girault et al. | 364/521 X |
| 4,384,338 | 5/1983 | Bennet | 364/522 |

Primary Examiner—Felix D. Gruber
Attorney, Agent, or Firm—Antonelli, Terry & Wands

[57] ABSTRACT

A digital system for producing a real-time visual display in perspective of the terrain over which an aircraft is passing on the basis of compressed digital data stored on a cassette tape includes a perspective processor for transforming the addresses of points in a two-dimensional data pattern to the addresses these points occupy in a three-dimensional scene and for filling in points between the transformed points to provide a complete display of the terrain in perspective.

42 Claims, 36 Drawing Figures

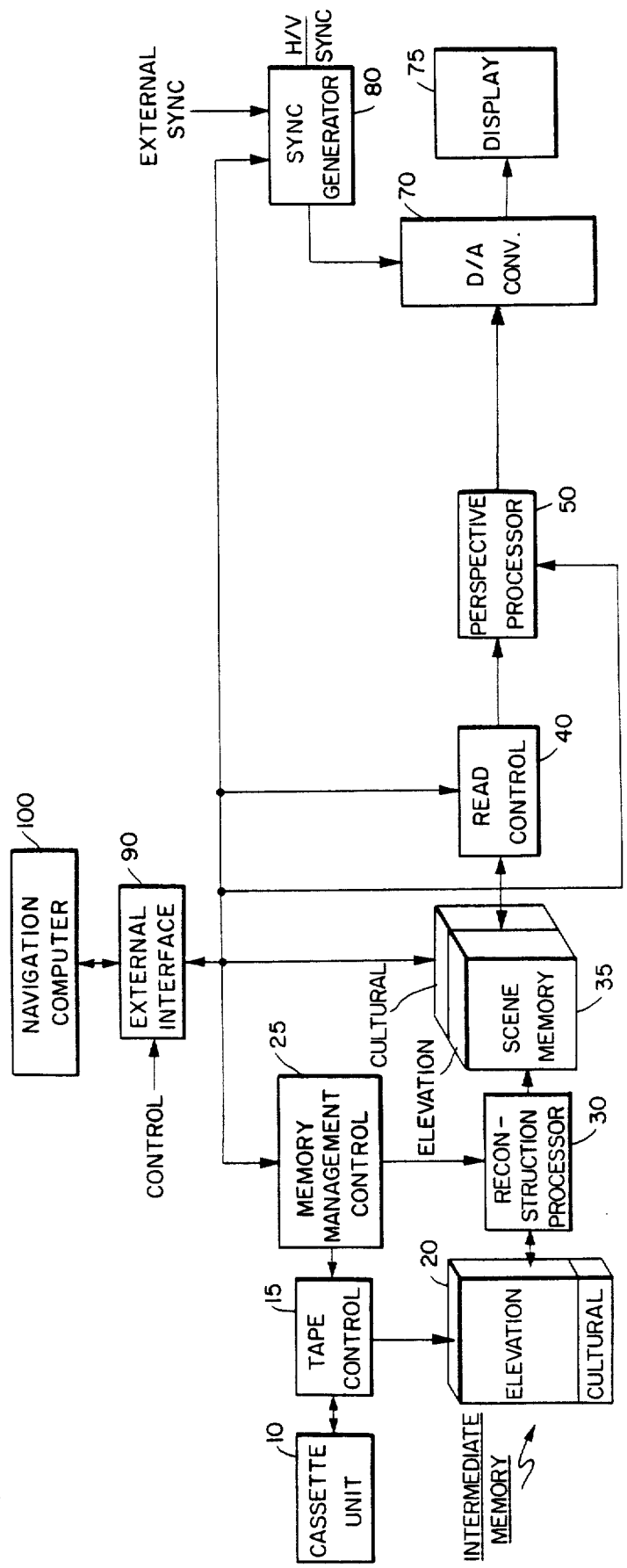

0°-45°

90°-135°

180°-225°

270°-315°

45°-90°

135°-180°

225°-270°

315°-360°

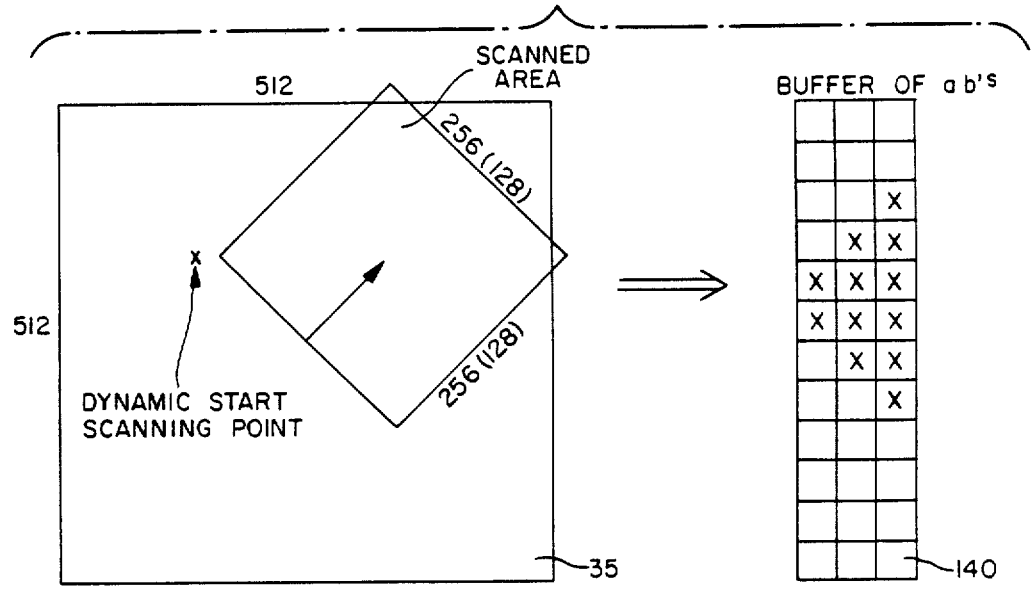
FIG. 13.
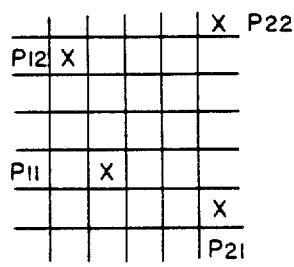
FIG. 14.
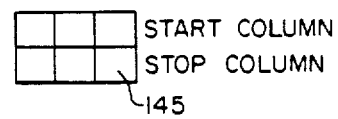
FIG. 16.
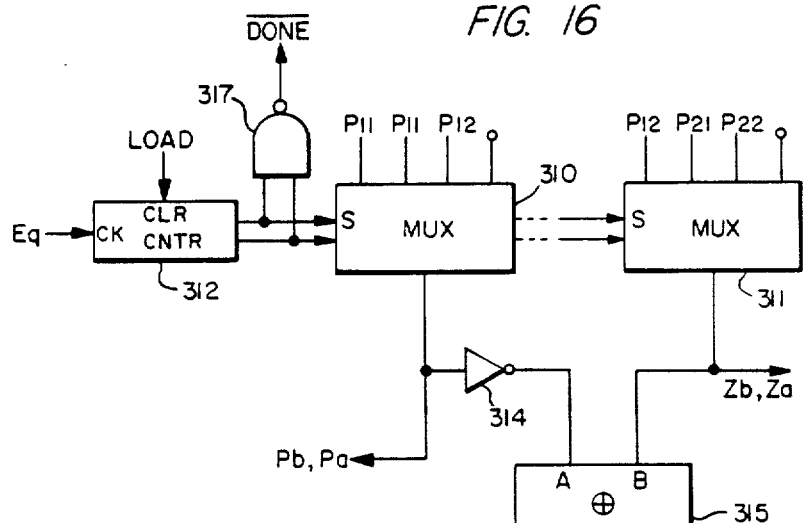
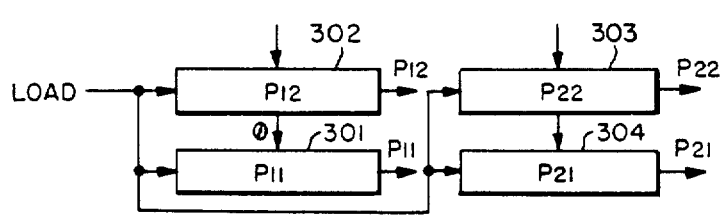
FIG. 15.
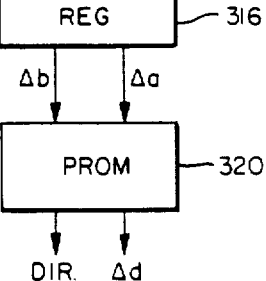

REAL TIME VIDEO PERSPECTIVE DIGITAL MAP DISPLAY

FIELD OF THE INVENTION

The present invention relates in general to information display systems, and more particularly, to a digital system for producing a real-time visual display in perspective of the terrain over which an aircraft is passing on the basis of display data reconstructed from compressed digital data and aircraft position, heading, and attitude information received from the on-board navigational computer of the aircraft.

BACKGROUND OF THE INVENTION

The proper control of an aircraft in all phases of its flight is based to a large extend upon the ability of the pilot to visually observe the terrain over which the aircraft is passing. In this regard, instrumentation, such as radar systems, and altimeters in combination with the use of accurate terrain maps aid the pilot in the flight of the aircraft; however, there are numerous conditions of flight which require actual observation of the terrain by the pilot to ensure proper navigation of the aircraft. For example, in cases of low altitude flying and landing of the aircraft under conditions which require quick reaction in the guiding of the aircraft over terrain which may provide rapidly changing contours and other obstacles to flight, the use of instruments alone is often unsatisfactory.

Accordingly, various systems have been proposed heretofore, including radar scanning systems and systems using preprocessed films of terrain over which an aircraft is to pass for providing to the pilot a display which simulates that which he would visualize if he were to actually view the terrain over which the aircraft is passing. One of the most recent developments in the area of moving map displays is a system for the dynamic display of terrain data which is stored as compressed data in digital form and which may be viewed on a cathode ray tube display in the form of a moving map that is automatically oriented under the control of the aircraft's navigational computer system to the instantaneous position of the aircraft with a heading-up disposition. Such a system is disclosed in copending U.S. application Ser. No. 224,742, filed Jan. 13, 1981, entitled "Digital Map Generator and Display System", in the name of Paul B. Beckwith, Jr., and assigned to the same assignee as the present application.

The system disclosed in the above-mentioned copending application provides a topographical two-dimensional real-time display of the terrain over which the aircraft is passing, and a slope-shading technique incorporated into the system provides to the display an apparent three-dimensional effect similar to that provided by a relief map. This is accomplished by reading compressed terrain data from a cassette tape in a controlled manner based on the instantaneous geographical location of the aircraft as provided by the aircraft navigational computer system, reconstructing the compressed data by suitable processing and writing the reconstructed data into a scene memory with a north-up orientation. A read control circuit then controls the read-out of data from the scene memory with a heading-up orientation to provide a real-time display of the terrain over which the aircraft is passing. A symbol at the center of display position depicts the location of the aircraft with respect to the terrain, permitting the pilot to navigate the aircraft even under conditions of poor visibility. However, the display provided by this system is in the form of a moving map rather than a true perspective display of the terrain as it would appear to the pilot through the window of the aircraft. Thus, the system disclosed in the copending application provides an arrangement for an indirect guidance of the aircraft over the terrain in that guidance is based upon the relative position of the symbol of the aircraft at the center of display position with respect to the moving map, rather than an arrangement for direct control of the aircraft with respect to the terrain on the basis of a three-dimensional display corresponding to the scene as it would actually appear to the pilot through the window of the aircraft.

Three-dimensional displays of terrain have been provided heretofore for aircraft guidance and flight simulation; however, such displays have been primarily simulated displays including only general characteristics of the terrain, such as an aircraft runway for aiding in aircraft landing and the like. Other systems for providing more detailed display of terrain data have been based on systems using preprocessed films of terrain. Unfortunately, such systems have not been entirely satisfactory in that they are often quite complex and are not capable of providing the detail insofar as elevation and cultural data is concerned which is required by the pilot of the aircraft for proper guidance. Such systems also are incapable of providing three-dimensional displays which correspond directly to a scene as might be observed through the window of the aircraft and, with the exception of the system disclosed in the above-mentioned copending Beckwith application, are incapable of providing a real-time display of terrain data taken into consideration changing altitude, heading and aircraft attitude.

BRIEF DESCRIPTION OF THE INVENTION

The present invention proposes a system for the dynamic display of terrain data which is stored in digital form and which may be viewed on a cathode ray tube display in the form of a moving map, similar to that disclosed in the above-mentioned copending Beckwith application, but represents an improvement over that system by provision of a perspective processor circuit for processing the data to produce a three-dimensional display of terrain equivalent to that which would appear to the pilot by direct observation of the terrain from the aircraft, if that were possible. This perspective processing circuit would replace the shades of gray processing circuit and slope-shading circuit provided in the previously-disclosed system to enable the provision of an actual three-dimensional display, rather than the topographical display in bass relief appearing as a simulated three-dimensional display in the previously-disclosed system of the copending application.

The perspective processing circuit of the present invention includes a read control which calculates a starting point for the scanning of data in the scene memory on the basis of the heading of the aircraft. Contrary to the system disclosed in the above-mentioned copending Beckwith application, the read control need not reorient the data read from the scene memory in accordance with the aircraft heading, since this will be automatically accomplished during perspective processing. However, in order to facilitate such perspective processing and the subsequent display, it is desirable to read out the data in the scene memory in accordance with the direction of heading of the aircraft. On the other hand, since the data is stored in the scene memory with a north-up orientation, scanning of that data is most easily effected either in a north-south direction or east-west direction. Thus, depending upon which of these two directions the heading is closest to, the starting point for scanning is selected along with the scanning direction to ensure that scanning will take place in a direction closest to the direction of heading of the aircraft.

The addresses of the elevation data read out of the scene memory representing points in the two-dimensional scene of the terrain are then transformed to relocate the points to positions where they would appear in a perspective scene of the terrain. Thus, each point in the two-dimensional scene is transformed to its new location in the perspective scene to be displayed on the viewing screen, and in the process, the data is automatically oriented with a heading-up disposition. The transformed points are then stored in a speed buffer for further processing by sun angle and line writing logic prior to being stored in a display memory from which data is read out to the display screen. Since data in the display memory represents one-to-one data to be displayed on the CRT, this data will be referred to as pixels (picture elements) in terms of its storage in the display memory for transfer to the CRT display.

One of the additional features of the present invention resides in the sun angle logic and line writing logic which operates on the transformed points to fill in shades of gray between the relocated points. The shades of gray (i.e. intensity of the CRT) are generated by the sun angle logic based upon the slope of the terrain at a given point rather than upon the absolute elevation of the point. By scanning rows of display data in a left-to-right direction, it becomes necessary to store in the display memory only the left-facing boundaries between changes in elevation. In this way, less data needs to be stored in the display memory, increasing the operation speed of the system by avoiding the processing of nonessential data. By simply filling in between boundaries as data is read out of the display memory to the display screen, the processing time of the system and the complexity thereof can be greatly reduced.

These and other objects, features, and advantages of the present invention will become apparent from the following detailed description of an exemplary embodiment of the present invention as illustrated in the accompanying drawings.

BRIEF DESCRIPTION OF THE DRAWINGS

FIG. 1 is a schematic block diagram of a display system incorporating the features of the present invention for providing a moving map display of terrain in perspective;

FIG. 2A is a diagram of the data format as provided in the data base of the system illustrated in FIG. 1;

FIG. 13 is a schematic diagram illustrating the storing of transformed data from the scene memory in the column buffers;

FIG. 14 is a schematic diagram of a point pattern used in describing the line writing logic;

FIG. 15 through 19 are schematic diagrams of the line writing logic circuit and column max. memory;

DETAILED DESCRIPTION OF THE INVENTION

One of the basic problems faced by systems which attempt to provide a real-time visual display of terrain on the basis of stored digital information relates to the ability to store sufficient information to provide all of the elevation features for a significant area of terrain over which the aircraft might wish to travel without limitation to a single predetermined flight path. In this regard, efficient digital terrain data storage is absolutely essential to a reduction of the capacity of the data base memory required for each aircraft if the on-board system is to be reduced to a practical size. The basic objective in this regard is to provide a practical aircraft operating range on a single large cassette tape that can be mission updated. This may be accomplished by utilizing a transformed compression approach which serves to convert the spatial elevation points to the frequency domain.

The compression and storage of terrain elevation data may be based on the Defense Mapping Agency data base which provides elevations on 12.5 meter grid points. Overall, the terrain elevation data can be compressed within 12.5 km square areas, which are submultiple of the 100 km square used on the transverse mercator projection military maps. Thus, the data base will be addressed on the basis of 16 bit X and Y coordinate words, each of which provide 3 bits for the 100 km identification, 3 bits for the 12.5 km identification, 3 bits for the 1.56 km identification and 7 bits for identification of the individual 12.5 meter grid points.

One of the largest capacity mass storage systems available for mobile applications is a cassette tape unit.

which is easily capable of providing storage capacities of up to 12 megabits in a single tape. With this in mind, if it is assumed that one-third of the storage capacity of the tape is reserved for non-elevation data, then eight megabits are available for elevation data storage. Conventional grid elevation data, stored as eight bits of data for each 12.5 m grid point, will use the available eight megabits in the form of a square area with 12.5 km per side. The discrete cosine transform compressed data approach may then use the available eight megabits to store a square area of approximately 140 km per side. Thus, it is quite apparent that all of the flight mission data can be stored on a single tape providing all of the information relating to a significantly-large area of terrain.

Figure 2B:
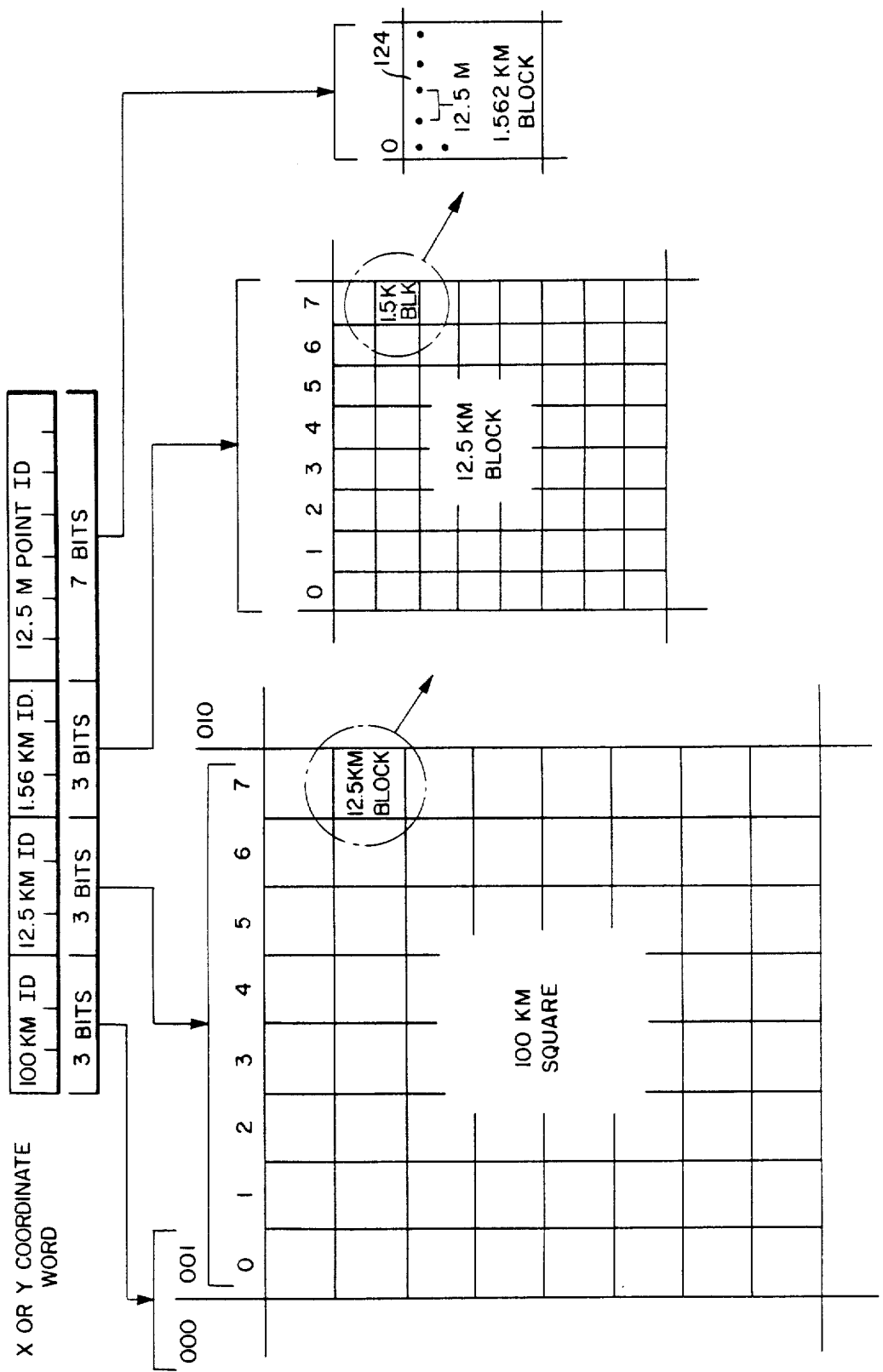
FIG. 2B is a diagram of the coordinate system used in the compression and storage of terrain data in the system of FIG. 1.

FIG. 1 is a basic block diagram of a system into which the present invention is incorporated for the dynamic display in perspective of terrain data including elevational information for use in the navigation of an aircraft along a predetermined flight path under control of a navigation computer 100 which is connected to the system via interface 90. Prior to flight operation, a cassette tape which stores the properly-formatted mission data is loaded into the cassette unit 10. The mission data, which includes compressed elevation grid data, is stored on the cassette tape in blocks organized according to their coordinate location in a format such as shown in FIG. 2A. In this regard, the header associated with each block will include the X and Y coordinate addresses of the block made up of three 100 km I.D. bits and three 12.5 km I.D. bits, as seen in FIG. 2B.

The output of the cassette unit 10 is applied through a cassette tape control unit 15 to an intermediate memory 20. Since the latency time of the cassette unit 10 (the difference in time between data requisition and data acquisition) can be as much as several seconds, which is clearly beyond the instantaneous response required in the system, the cassette tape unit 10 is not used as the primary source for acquiring data processing. Rather, the intermediate memory 20 is provided as the primary data source and the cassette unit 10 supplies data in compressed form to the intermediate memory 20 as required under control of the tape control unit 15.

The cassette unit 10 will be accessed relative to translatory movement of the aircraft and the maximum cassette tape access rate, under control of the memory management control 25, which is responsive to control signals and data received from the on-board navigation computer 100 in the aircraft. The computer 100 provides various information concerning the aircraft itself, such as altitude, ground speed, attitude and heading, in addition to the present coordinate location of the aircraft, which forms an instantaneous coordinate for data control within the system.

The tape control unit 15 controls the cassette tape unit 10 to search the tape and read the mission data corresponding to the geographical position of the aircraft as received from the navigation computer 100 under control of the memory management control 25, and the required data is loaded into the intermediate memory 20, which provides the fast data access capability required by the system. The memory management control 25 controls the tape control unit 15 so as to ensure that the terrain data stored in the intermediate memory 20 will always be sufficient to support the required processing and resultant display. Thus, the memory management control 25 functions to control both the read and write operations of the intermediate memory 20 and manages the data routing in conjunction therewith.

As indicated, the basic objective of the intermediate memory 20 is to solve the problem concerned with slow serial access of the cassette unit 10. Thus, the intermediate memory 20 acts as a speed buffer memory, inputting data from the slow cassette unit 10 and providing fast output to a data reconstruction processor 30 which serves to reconstruct the compressed elevation data into the format required for processing and subsequent display.

Upon receiving position commands from the navigation computer 100, the memory management control 25 will determine which of the 12.5 km blocks of data are required to fill out the intermediate memory 20 with the aircraft at a position which will provide sufficient terrain data for display in the direction of heading, and, the tape unit 10 will be controlled via the tape interface 15 to read out the designated data blocks to the memory 20, filling that memory. Then, as the aircraft moves, based on the heading and position data received from the navigation computer 100, the memory management control 25 will determine which new blocks of data will be required from the tape and which old blocks in the memory 20 are no longer needed, and the intermediate memory 20 will be updated to ensure a valid display. At the same time, the reconstruction processor 30 will be controlled to read out data from the memory 20 and reconstruct it to a non-compressed form.

The reconstructed data obtained at the output of the processor 30 is applied to a scene memory 35. The data reconstruction processor 30 accesses the intermediate memory 20 under control of the memory management control 25 on the basis of data provided by the on-board navigation computer 100, and the compressed elevation data is then reconstructed into the elevation format required for perspective processing. The data reconstruction interval can be externally selectable at 1:1, 2:1, 4:1 or 8:1 scale. This reconstruction data is loaded into the scene memory 35 at addresses associated with the center of display location.

The data in the scene memory 35, like the data on the cassette tape in the cassette unit 10 and the data in the intermediate memory 20, has a constant north-up orientation. Data other than elevation data, such as annotated flight data, are stored in a separate section of the scene memory 35 from the elevation data, but are address related to the elevation data so as to be read out simultaneously therewith. The data which is stored in the scene memory 35 at all times maintains this north-up orientation and is related to the center of display position. In order to convert this data from a two-dimensional to a perspective representation of terrain for display purposes, a read control circuit 40 controls the scene memory 35 to read the data therefrom in sequential rows which are parallel to the north-south coordinate or the east-west coordinate, whichever makes the smallest angle with the angular heading of the selected reference location, i.e., the heading of the aircraft at the coordinate location thereof. The proper heading-up orientation of the display data is then provided by the subsequent perspective processing of the data, as will be described hereinafter.

Figure 3:
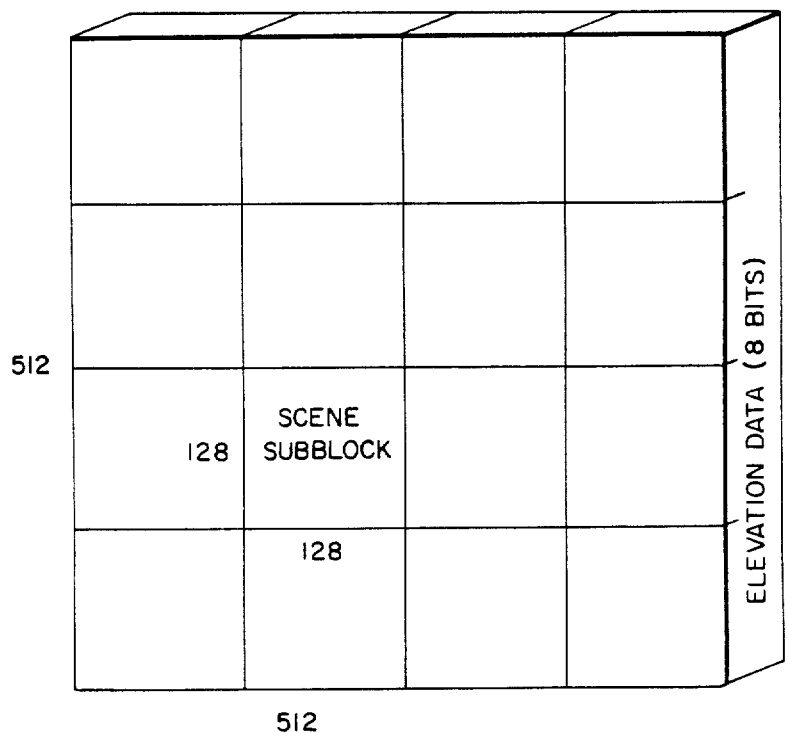
FIG. 3 is a schematic representation of the scene memory map.

The scene memory 35 is divided into scene subblocks, as seen in FIG. 3. Similar to the intermediate memory 20, the scene memory 35 has a size which is based on a terrain square with the aircraft located at a position which will provide sufficient terrain ahead of the aircraft for display purposes, and the size of the terrain square is a function of the range scale selected. Thus, the sides of the terrain square will be 6.4 km for a 8:1 and 51.2 km for a 1:1 scale. The elevation data section of the scene memory uses 8 bits per grid point to define the relative elevation. The absolute elevation of a grid point is related to the relative elevation stored in the scene memory by the following equation:

$$E_{abs} = E_b + S_f E_i,$$

wherein:
$E_{abs}$ = absolute elevation,
$E_b$ = base elevation of subblock,
$S_f$ = scale factor of subblock, and
$E_i$ = relative elevation of grid point.

The base elevation and scale factor are stored with the associated scene memory subblock address in an index register forming part of the read control 40.

Eight bit elevation data is read out of the scene memory 35 under control of the read control 40 as four adjacent grid points at a time, and this data is operated on by the perspective processor circuit 50 to translate the points from their locations in a two-dimensional pattern to new locations in a pseudo three-dimensional display pattern. This processing also includes the necessary inhibiting of those relocated points which end up behind other points in the display on the basis of the difference in elevations of the points involved. Thus, where background terrain folds-back behind higher elevation terrain in the foreground of the display, the hidden background terrain must be inhibited in the display. To this processed data there is also added slope shading to provide a fully-realistic display in perspective of the selected terrain as might appear to the pilot through the windows of the aircraft.

Figure 4:
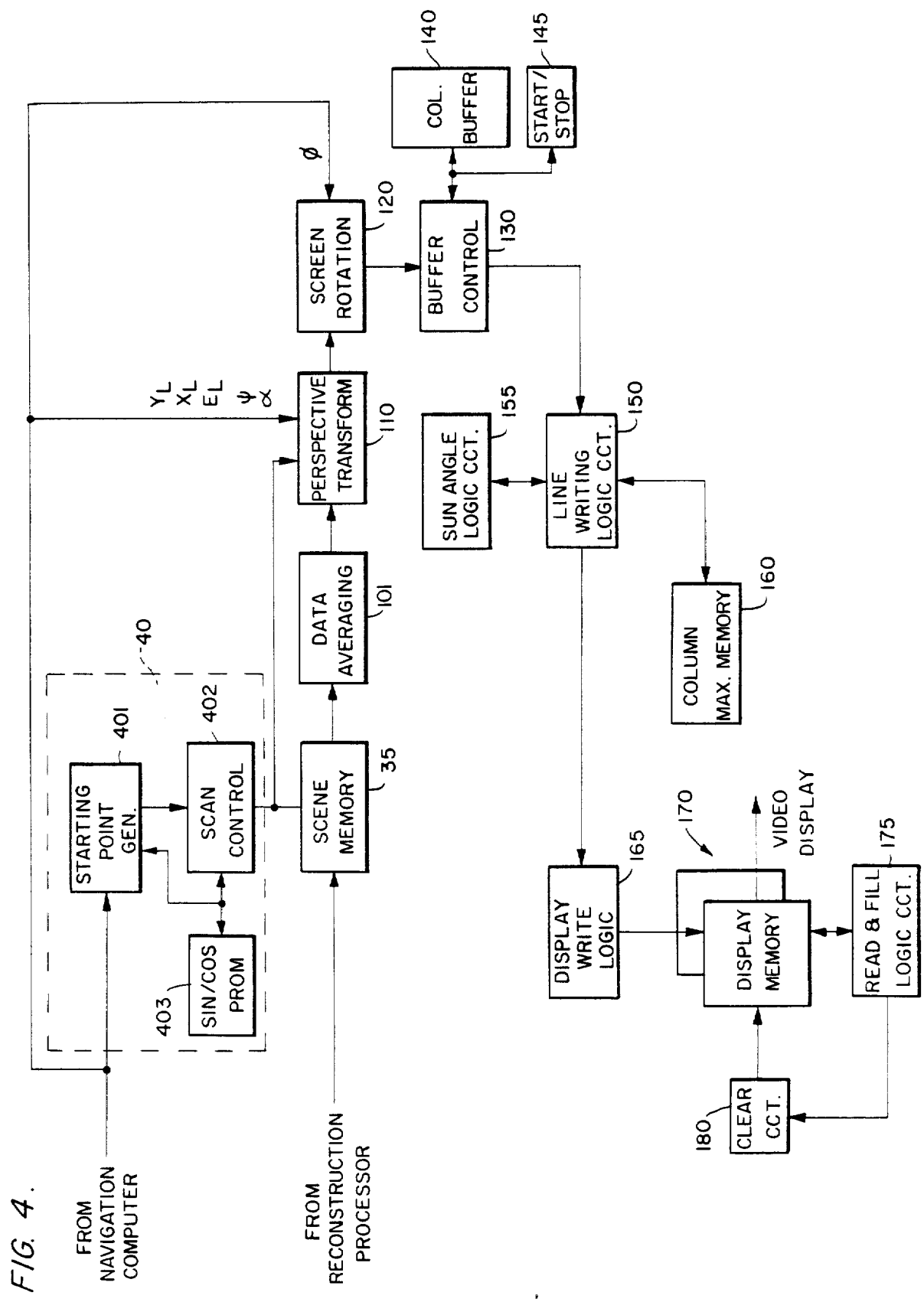
FIG. 4 is a schematic block diagram of the perspective processing circuit.

The output of perspective processor 40, the details of which will be described below with reference to FIG. 4, is converted to analog form (intensity level (shades of gray) signals) by a D/A converter 70. The output of D/A converter 70, which is controlled by sync generator 80, is coupled to a display device (CRT) 75 to provide the perspective display.

Figure 5:
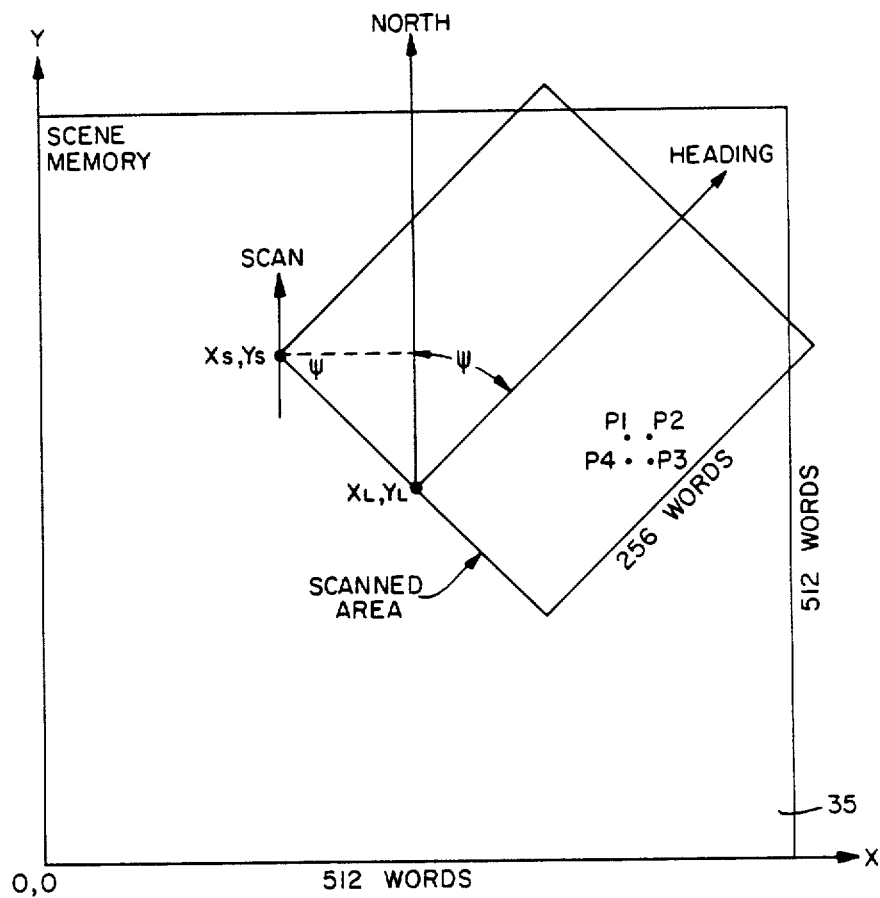
FIG. 5 is a schematic diagram illustrating the starting point calculation and scanning as applied to the scene memory.

FIG. 4 is a schematic block diagram of the details of the perspective processing circuit 50, including the read control 40 for controlling the scanning of the scene memory 35, and FIG. 5 is a schematic diagram which will be referred to in describing the reading out of data from the scene memory 35 under control of the read control 40.

The elevation data stored in the scene memory 35 is provided in a 512×512×8 bit memory format which may be addressed by an 18 bit address consisting of a 9 bit Y address and a 9 bit X address. In reading data out of the scene memory 35, scanning occurs in an area which is 256 words×256 words and is oriented in the direction of the heading of the aircraft with the center of display position $X_L$, $Y_L$ representing the location of the aircraft being positioned at the center of one edge of the scanned area.

The memory 35 is organized in an X-Y coordinate plane, the origin of which is located initially at the bottom left-hand corner. Since each location in memory can be identified by an X and a Y coordinate, any point in a rotated sequence, such as within the active display area, at any angle of rotation, can be calculated from the aircraft position using a simple trigonometric equation based on the aircraft heading. Thus, as seen in FIG. 4, the read control 40 which generates the read addresses for reading data from the active display area of the scene memory 35 consists of a starting point generator 401, a scan control 402 and a sin/cos PROM 403 providing trigonometric values to both the starting point generator 401 and scan control 402.

Since data is stored in the scene memory 35 with a north-up orientation, the grid points of the stored data will be aligned in the north-south and east-west direction. The most simplified scanning arrangement therefore provides for scanning along either of these two primary directions. Since it is desirable in generating a perspective display to read out along a given scan line points which are nearer to the viewer before encountering more distant points so as to facilitate the processing of hidden points in the perspective display, it is desirable to scan in a direction as close to the heading of the aircraft as possible. Accordingly, scanning is effected either along the north-south direction or along the east-west direction depending upon which has the smallest angle with the heading of the aircraft. Thus, the starting point for the scan and the direction of scan are selected in accordance with the heading, as illustrated in FIGS. 7a-7h.

The generation of the starting point for the scan by the starting point generator 401 is determined from the aircraft position $X_L$, $Y_L$ and the heading angle of the aircraft $\psi$, which quantities are provided by the navigation computer the starting point $X_s$, $Y_s$ is defined by the following equations:

$$X_s = X_L \pm 128 \cos \psi$$

$$Y_s = Y_L \pm 128 \sin \psi$$

The cos $\psi$ and sin $\psi$ values are provided to the starting point generator 401 from the PROM 403. In each of the above equations, the plus sign or minus sign depends on the heading angle and is determined in accordance with the relationships illustrated in FIGS. 7a-7h by the navigation computer 100.

FIG. 5 shows the scene memory 35 with the scanned area rotated by an angle $\psi$ from north in accordance with the aircraft heading. Once the starting point $X_s$, $Y_s$ of the rotated scanned area is determined by the starting point generator 401, the scan control 402 begins scanning of the area by generating read-out addresses to read out the data of the scene memory which falls within that area. On the basis of the heading provided by the navigation computer 100, the scan control 402 will determine which direction the scanning is to take as determined by the smallest angle between the heading and the north or east grid lines in the scene memory 35. Since this scanning will take place along either the north or east grid lines, the scan equations which govern the generation of read out addresses will merely provide for the incrementing or decrementing of the address in the X or Y direction. If it is desirable not to read out data outside of the field of view area during the scanning of the scene memory 35, the scan control 402 can be designed to calculate a new starting point for each scan line along the edge of the scanned area, and this calculation can be effected in a manner similar to the calculation of the original starting point $X_s$, $Y_s$ at the beginning of scanning.

Figure 6:
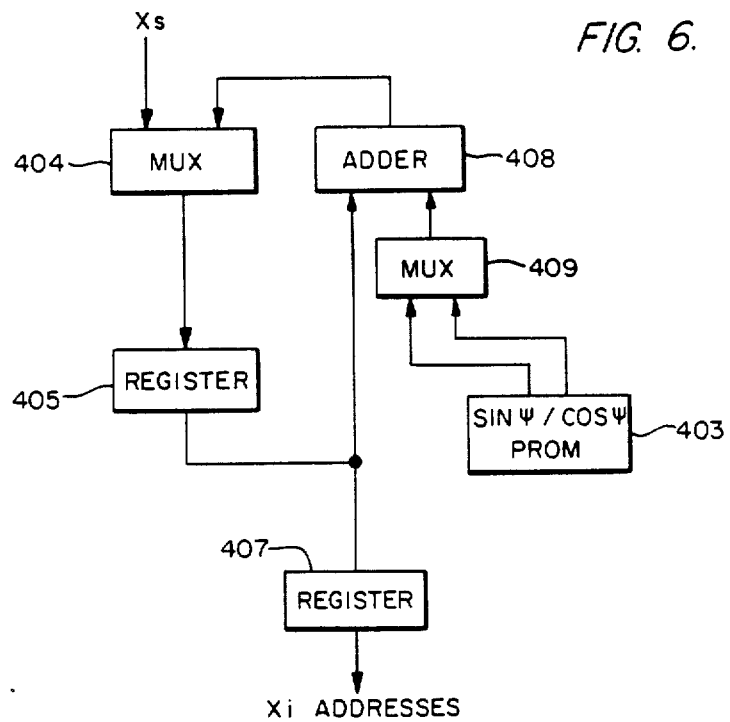
FIG. 6 is a schematic block diagram of the X-scanning portion of the scan control for the scene memory.

FIG. 6 shows a portion of such starting point calculating circuit as applicable to the X addresses, a similar circuit being provided for calculation of the Y coordinate of the starting point for each line scan. In FIG. 6, a multiplexer 404 receives at one input the X coordinate of the starting point for the previous line scan, and this value is stored in the register 405 for calculation of the next coordinate of the starting address for the next scan line. In the calculation of each successive starting address coordinate along the scan line, the value of sin $\psi$ or cosin $\psi$ is supplied via the multiplexer 409 from the PROM 403 to one input of the adder 408, the other input of which receives the contents of the register 405. The output of adder 408 is then supplied via multiplexer 404 to register 405 where it is stored as the new coordinate for the starting address of the next scan line. The coordinate stored in the register 405 is successively provided to the register 407 where it is supplied to begin the scanning of each scan line, the incrementing or decrementing of the X or Y value, as required, being then carried out by a simple counting circuit (not shown).

Figure 7A:
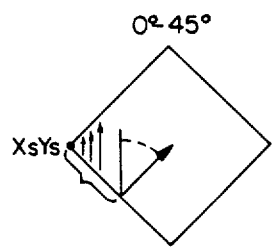
FIGS. 7A-7H are schematic diagrams which illustrate the various scanning directions and selected starting points based on aircraft heading.
Figure 7C:
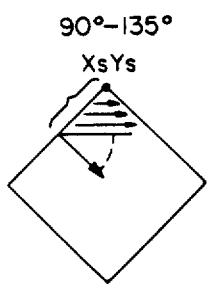
Figure 7E:
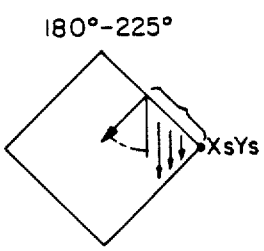
Figure 7G:
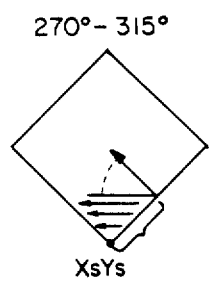
Figure 7B:
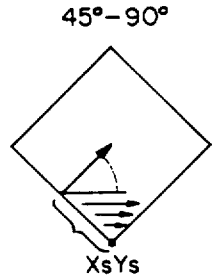
Figure 7D:
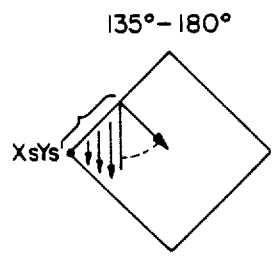
Figure 7F:
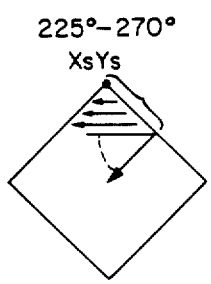
Figure 7H:
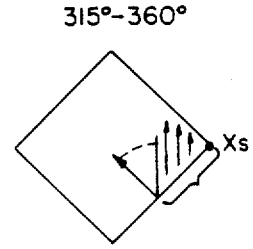

In the example illustrated in FIG. 5, the aircraft heading falls within the range provided in FIG. 7a with $\psi=45°$ to the north orientation of data in the scene memory 35. Accordingly, the scanning of the points in the scene memory 35 occurs in alignment with the north-south direction, with the scan lines successively increasing and then decreasing from left to right through the scanned area.

Figure 9:
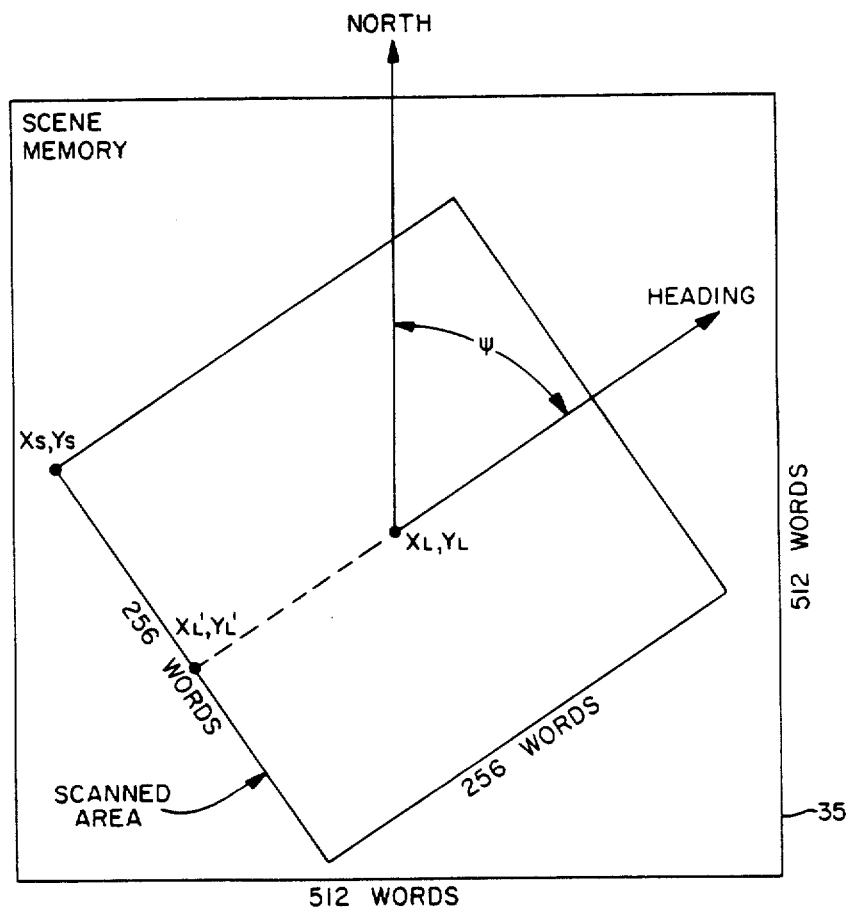
FIG. 9 is a schematic diagram illustrating the starting point calculation for a vertical viewing screen angle as applied to the scene memory.
Figure 8:
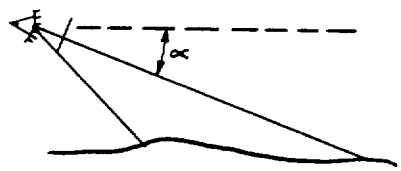
FIG. 8 is a schematic diagram of the relationship of viewing screen angle to the resultant display.

In this example, the scanned area is located within the scene memory 35 so that the position of the aircraft $X_L$, $Y_L$ falls on one side edge with the scanned area extending from that edge in the direction of the heading of the aircraft. The display which will result from the data read from the scene memory 35 in this way will include the terrain which extends from a point beneath the aircraft forward by a predetermined distance in the direction of the heading of the aircraft in accordance with the size of the scanned area. As seen in FIG. 8, such a display corresponds to a viewing angle $\alpha$ with respect to the horizontal which is 45° so that no terrain behind the aircraft will be displayed on the viewing screen. However, if it is desired by the pilot to view an area around the aircraft including terrain behind the aircraft, corresponding to a viewing angle $\alpha$ equal to 90° or greater, this may be accomplished simply by initially shifting the designated aircraft location $X_L$, $Y_L$ toward the center of the scanned area in the scene memory 35 by an amount corresponding to the amount of terrain behind the aircraft which the pilot desires to view. In FIG. 9, for example, a viewing angle $\alpha$ equal to 90° places the aircraft at the center of the active display area, thereby providing a topographical display of data. In calculating the starting point for the scan, the system merely translates the aircraft position $X_L$, $Y_L$ in the scene memory 35 to an apparent $X'_L$, $Y'_L$ along the edge of the scanned area and then calculates the starting point $X_s$, $Y_s$ in the conventional manner and initiates scanning similar to that provided in the example of FIG. 5. The selection of the angle $\alpha$ for the viewing screen can be chosen manually by the pilot in terms of the number of grid points in the scene memory 35 through which the aircraft position $X_L$, $Y_L$ is shifted in an opposite direction to the aircraft heading.

Data is read from the scene memory 35 in the form of four adjacent grid points at a time. For example, as seen in FIG. 5 in greatly-exaggerated scale, the four adjacent points P1, P2, P3 and P4 would be read out from the scene memory 35 simultaneously in response to a single applied address. This is accomplished quite simply by structuring the scene memory so that the four points P1–P4 are stored at the same address locations in four separate portions of the scene memory.

The elevation data read from the scene memory 35 is applied to a data averaging circuit 101 which takes the mathematical average of each set of four elevation grid points read simultaneously from the scene memory 35. In this regard, since the size of the active display area in the scene memory 35 is 256×256 grid points, the data averaging performed by the circuit 101 will in effect reduce the data obtained from the active display area to average elevation data values associated with 128×128 points. Associated with the 128×128 averaged elevation values, the averaging circuit 101 also provides averaged X and Y addresses as inputs to the perspective transform circuit 110. This does not significantly affect the resolution of the resulting display and serves to cut down considerably on the amount of data to be processed subsequently in the system.

Figure 10:
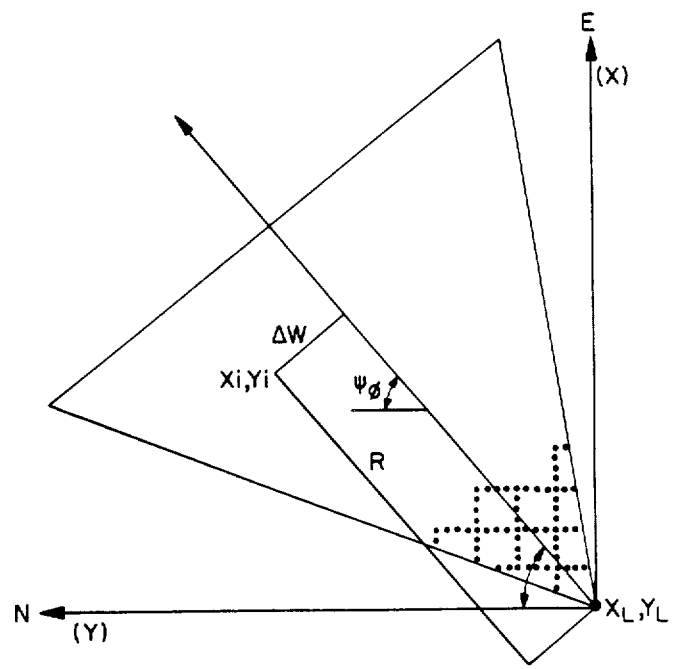
FIG. 10 is a schematic diagram illustrating the geometry in obtaining an address in the scene memory in conjunction with perspective processing.

The output of the data averaging circuit 101 is applied to the perspective transform circuit 110, the purpose of which is to transform the address of each averaged point in the two-dimensional scene to the address that same point will occupy in a three-dimensional scene providing a heading-up display of the terrain. A point in the perspective display may be calculated on the basis of the location $X_L$, $Y_L$ of the aircraft from which the scene is to be viewed, the elevation of the display (i.e. aircraft) relative to the average elevation point $\Delta E$, the angle $\alpha$ of a line transverse to the viewing section and the horizontal, and the heading $\psi$ in relation to the north coordinate. FIG. 10 illustrates the geometry associated with the perspective transform as it relates to the address $X_i$, $Y_i$ of a grid point in the scene memory 35. The relationship for $\Delta W$, R and $\Delta E$ are:

$$\Delta W = |X_i \cos \psi - Y_i \sin \psi + [Y_L \sin \psi - X_L \cos \psi]|$$

$$= (X_i - X_L) \cos \psi - (Y_i - Y_L) \sin \psi$$

$$R = |X_i \sin \psi + Y_i \cos \psi - [X_L \sin \psi + Y_L \cos \psi]|$$

$$= (X_i - X_L) \sin \psi + (Y_i - Y_L) \cos \psi$$

$$\Delta E = E_L - (E_b + S_f E_i)$$

where $E_L$ is the elevation of the aircraft above sea level at the location of the aircraft (supplied from an external navigation computer), and the quantity $(E_b + S_f E_i)$ is the absolute elevation of the averaged point defined previously. In the process of storing elevation data on the cassette tape, an effort is made to represent the elevation values by no more than eight bits; however, to store the absolute value of the higher elevations on earth in meters requires as many as fourteen bits. Thus, elevation data is stored on the cassette tape as a value $E_i$ which is related to the difference between the actual elevation of that point and a base elevation $E_b$ by a scale factor $S_f$. Thus, to recreate the actual or absolute elevation of a point, the value $E_i$ is multiplied by the scale factor and the result is added to the base elevation $E_b$.

Figure 11A:
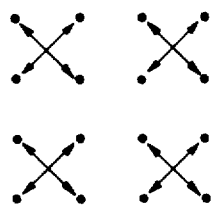
FIGS. 11a through 11e are schematic illustrations of data point patterns showing the perspective processing technique of the present invention.
Figure 11B:
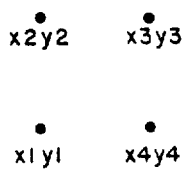

As already indicated, four grid points at a time are read from the scene memory 35 and applied to the data averaging circuit 101. As seen in FIG. 11a, the groups of four pixels are averaged by the data averaging circuit 100 to reduce the amount of data to be processed resulting in a transformation of data of FIG. 11a to a configuration such as seen in FIG. 11b, with each of the points (representing an average elevation), having an averaged X, Y address. The averaged elevation and address values output from the data averaging circuit 101 are coupled to the perspective transform circuit 110 as they are calculated (the entire 128×128 array of average points is coupled without storage to perspective transform circuit 110 in a pipeline fashion as shown in FIG. 4). The perspective transform circuit 110 will input these points individually and calculate on the basis of the relationships for $\Delta W$, R and $\Delta E$ as well as certain data obtained from the navigation computer 100, new addresses for the points so as to relocate these points from their X,Y location in the scene memory to their a,b location in the perspective display, as illustrated by way of example in FIG. 11c. The values a,b represent pixel addresses of pixels in the display memory (0,0 represents the lower left corner) which represents an image on the displace device.

Figure 12:
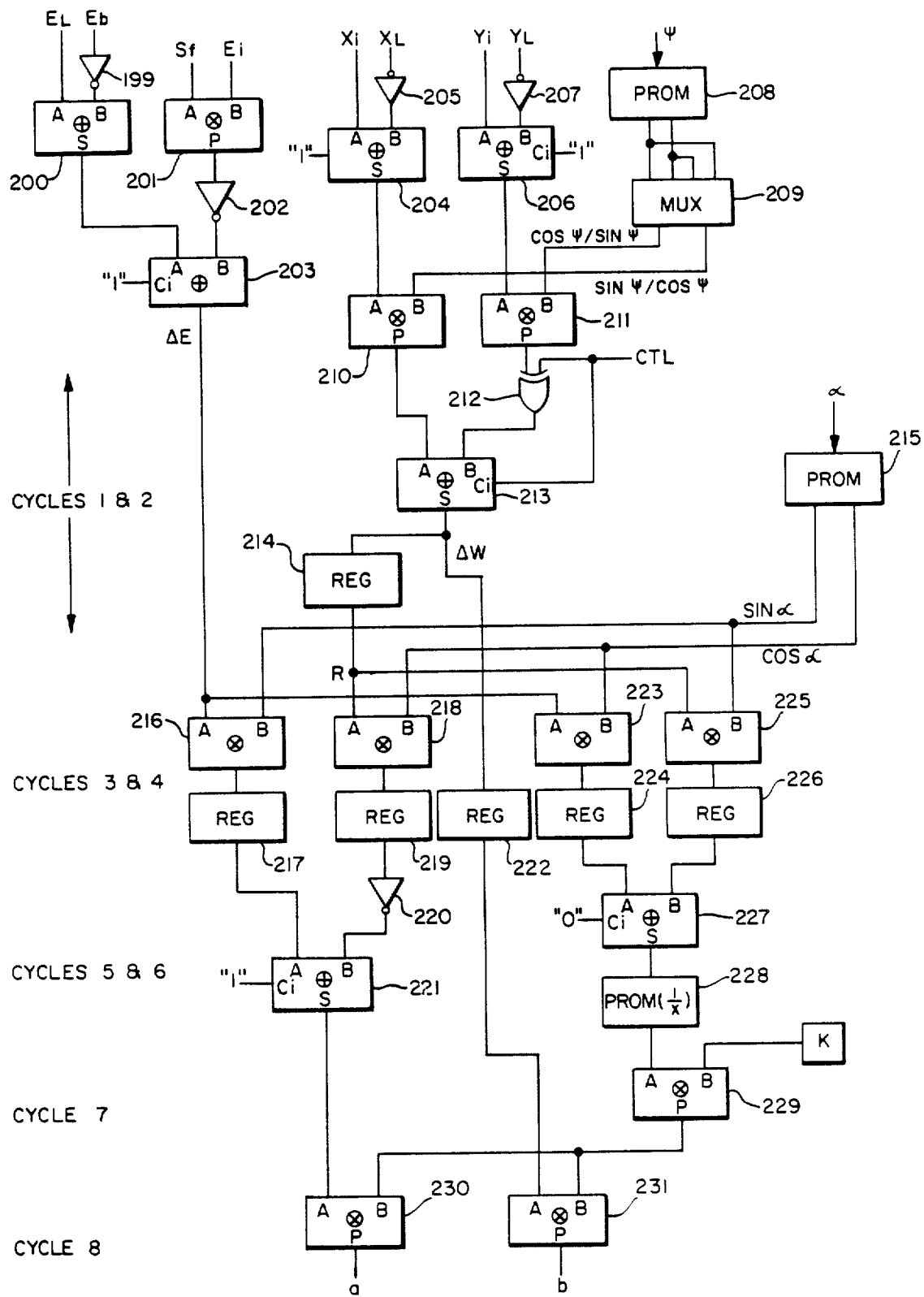
FIG. 12 is a schematic diagram of the perspective transform circuit.

The a,b addresses of the pixels in the perspective display are calculated by the perspective transform circuit 110, which is illustrated in FIG. 12. The value $E_L$ is applied to one input of an adder 200, to the other input of which is applied the value $E_b$ via an inverter 199. The value $S_f$ is applied to one input of a multiplier 201, to the other input of which is supplied the value $E_i$. An adder 203 then receives the output of adder 200 at one input thereof, and at the other input thereof there is received the output of multiplier 201 via inverter 202. The output of the adder 203 represents the calculated value $\Delta E$ in accordance with the foregoing relationship.

The pixel address $X_i$ is applied to one input of an adder 204, while the other input thereof is supplied with the address value $X_L$ via an inverter 205. The address value $Y_i$ is applied to one input of an adder 206, while the other input thereof receives the address value $Y_L$ via an inverter 207. The output of the adder 204 is supplied to one input of a multiplier 210, the other input of which receives the sin $\psi$/cos $\psi$ value based on the aircraft heading from a PROM 208 via a multiplexer 209. Similarly, the multiplier 211 receives at one input the output of the adder 206 and at the other input thereof it receives the cos $\psi$/sin $\psi$ values from the PROM 208 via multiplexer 209. The output of the multiplier 210 is supplied to one input of an adder 213, while the output of multiplier 211 is supplied through an EXCLUSIVE OR gate 212 to the other input of adder 213. The output of adder 213 will provide either the value R or the value $\Delta W$ depending on the cycle of operation in which either the cos or sin value of $\psi$ is provided to the respective multipliers 210 and 211 by the multiplexer 209. A register 214 stores the value R as supplied by the output of adder 213 while the value $\Delta W$ is supplied from the adder 213 directly to register 222.

One input of multiplier 216 receives the value $\Delta E$ from the output of adder 203 while the other input thereof receives the value sin $\alpha$ from PROM 215. The output of multiplier 216 is stored in register 217. The value R received from register 214 is applied to one input of a multiplier 218, the other input of which receives the value cos $\alpha$ from the PROM 215. The output of multiplier 218 is stored in register 219. The value $\Delta E$ from adder 203 is also applied to one input of a multiplier 223, the other input of which receives the value cos $\alpha$ from the PROM 215. The output of multiplier 223 is stored in register 224. The value R is also supplied to one input of a multiplier 225, the other input of which receives the value sin $\alpha$ from the PROM 215. The output of multiplier 223 is stored in register 224. The value R is also supplied to one input of a multiplier 225, the other input of which receives the value sin $\alpha$ from the PROM 215. The output of multiplier 225 is stored in register 226.

During cycles 5 and 6 of the respective transform operation, the content of register 217 is supplied to one input of adder 221, the other input of which receives the content of register 219 via inverter 220. Then, the contents of registers 224 and 226 are supplied to respective inputs of adder 227, the output of which addresses a PROM 228 which produces outputs representing the reciprocal value of the inputs thereto. During cycle 7 of the operation, these values which are read out of the PROM 228 are supplied to one input of a multiplier 229, the other input of which receives the constant value K, proportional to the terrain separation of points represented in the scene memory.

During the eighth and final cycle of the operation, the address values a,b of the display pixel are produced. The multiplier 230 receives at one input thereof the output of adder 221 and at the other input thereof the output of multiplier 229. The multiplier 231 on the other hand receives at one input thereof the $\Delta W$ value stored in register 222 and at the other input thereof the output of multiplier 229.

Figure 11C:
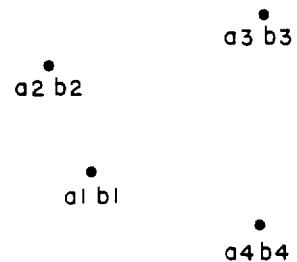

The perspective transform logic circuit illustrated in FIG. 12 generates the addresses a,b for each point supplied thereto from the data averaging circuit 101. As seen in FIGS. 11b and 11c, four regularly-spaced points $X_1$, $Y_1$ to $X4'_4$, $Y_4$ may be transformed in the perspective display to an irregular pattern of points $a_1$, $b_1$ to $a_4$, $b_4$.

The points which are output by the perspective transform circuit 110 are supplied to a screen rotation circuit 120 which serves to rotate the display data in accordance with the roll of the aircraft so that the display will accurately depict the view as it would appear, if visible, through the window of the aircraft. The screen rotation operation performed by the circuit 120 is comparable to the rotation of data as effected by the read control 40 for purposes of producing a heading-up display of the data which is stored in the scene memory 35 with a north-up orientation. Indeed, this rotation of data which is based upon a simple trigonometric calculation depending upon the roll angle of the aircraft is similar to the rotation of data effected by the read control in the two-dimensional display system disclosed in the aforementioned copending Beckwith application. Thus, in the screen rotation circuit 120, the logic will calculate the new location a', b' on the basis of the roll angle $\phi$ of the aircraft in accordance with the following relationships:

$b' = a \sin \phi + b \cos\phi$ $a' + a \cos \phi - b \sin\phi$

A simple logic circuit including a PROM providing the sin/cos values of $\phi$ in response to the roll angle of the aircraft supplied from the navigational computer 100 comprises the screen rotation circuit 120.

The grid points which have been read from the scene memory 35 have been data averaged by the circuit 101, perspective transformed by the circuit 110 and rotated by the screen rotation circuit 120. In order to accommodate the difference in speed between these operations and the rather more-rapid processing of the data which is to take place in the remainder of the display system, as seen in FIG. 4, a buffer arrangement is provided at the output of the screen rotation circuit 120 which includes a buffer control 130, a column buffer 140 and a start/stop circuit 145. The buffer 140 consists of three columns of storage locations in which the successively-processed points (a,b display address and evaluation) are stored in accordance with the X,Y address at which they are stored in the scene memory 35, rather than the a,b transformed address in the perspective display. This is schematically illustrated in FIG. 13, which shows the scene memory 35 and an active display area therein as provided for a heading angle of 45° with respect to the north orientation of the data stored in the memory 35. As already described, scanning with such an arrangement, will take place in a north-south direction beginning with the starting point in the left-most corner of the rotated active display area. As scanning proceeds, the grid points which are read out of the scene memory 35 are averaged, transformed for perspective and rotated in accordance with aircraft roll prior to being stored in the column buffer 140 in accordance with their relative position in the scene memory 35.

The column buffer 140 consists of three columns of storage locations, each column having a capacity of 256 storage locations. In this regard, the data averaging circuit 100 will, in effect, reduce the active display area from 256×256 to 128×128 as a result of the averaging of each group of four grid points read from the scene memory 35, and with scanning as seen in FIG. 13 in a vertical or north-south direction, the maximum number of points to be stored in a single column of the column buffer 140 from the 128×128 group of averaged points will be the averaged points which extend across the diagonal of the square active display area or at most $128\sqrt{2}$ points. Further, while the column buffer 140 may be of a size which can accommodate all of the points in the active display area, i.e., $128\sqrt{2}$ columns, the speed buffer requirements of the column buffer 140 necessary to accommodate the following processing of the points merely necessitates the storing of three columns of points at a time.

The buffer control 130 controls the scanning of the column buffer 140 to provide for storing of points therein and reading of points therefrom. As seen in FIG. 13, during the storing of data in column buffer 140, only portions of the available space in each column will actually contain data, especially during the beginning and ending portions of the scan of the active display area. To simplify the read-out of data from the column buffer 140 and increase the speed of such a read-out operation, a start/stop column control store 145 is provided under control of the buffer control 130. As each column in the column buffer 140 is being scanned for the storing of data therein, the buffer control 30 will insert in the store 145 the position in the column at which data starts and the position in that column at which data stops. Then, during the reading of data from the column buffer 140, the scanning of the column will start and stop at those positions indicated by the store 145.

The buffer control 130 comprises a simply recirculating counter arrangement for scanning the three columns of the column buffer 140 in sequence for the writing of data into the buffer 140. This counter arrangement is synchronized with the scan control for the scene memory 35 to provide for proper storing of data in the column buffer 140 at those positions corresponding to the positions in the scene memory 35 from which the data has been read out. For the reading of data out of the column buffer 140, a counter arrangement which is presettable at the values of the start/stop store 145, controls the scanning of each column to read out 2 points from adjacent columns at a time which constitute a portion of a block that has been mapped onto the screen display by the transform operation performed in the perspective transform circuit 110.

Figure 11D:
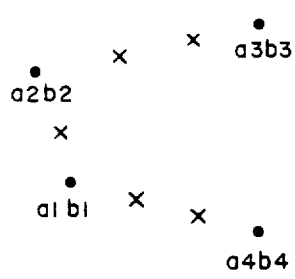
Figure 11E:
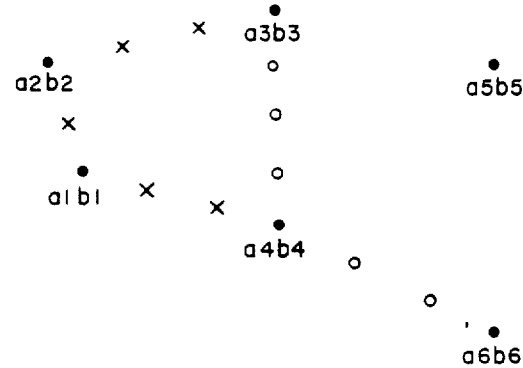

The data which has been read out of the column buffer 140 via the buffer control 130 is supplied to line writing logic 150, as seen in FIG. 4. The logic circuit 150 operates in conjunction with a sun angle logic circuit 155 to fill out boundaries of the blocks of four points as transformed by the perspective transform circuit 110. As seen in FIGS. 11b and 11c, the regularly-spaced block of four points at points X1, Y1 to X4, Y4 is transformed in the illustrated example to an irregular pattern at points A1, B1 to A4, B4 by the perspective transform circuit 110. The function of the line writing logic circuit 150 in conjunction with the sun angle logic circuit 155 is to fill in the lines between the four points of each block as indicated by the x'es provided in FIG. 11d, for example. In this regard, since the video display data will be eventually read out of a display memory by left-to-right scanning of the memory, in the generating of lines between the four points, only the left-facing lines need be written. As seen in FIG. 11e, for example, the line writing associated with the four points a1a1, a2b2, a3b3 and a4b4 will fill in the points designated by the letter x, which are left-facing lines. The line between the points a3b3 and a4b4 need not be filled in at this time, since that line will be generated at the time the line-writing logic circuit 150 operates a later set of four points, i.e., a4b4, a3b3, a5b5 and a6b6 to fill in the two left-facing lines indicated by the letter o in FIG. 11e. Again, the line between the points a3b3 and a5b5 need not be filled in at this time since that line will be generated when these points are evaluated in combination with the two points displaced vertically above.

The details of the line-writing logic circuit 150 will be described in conjunction with FIGS. 15 and 18, with reference to the point pattern illustrated in FIG. 14. As already indicated, two points at a time will be supplied to the line-writing logic circuit 150 from the column buffer 140 via and under control of the buffer control 130; however, the line writing logic circuit 150 will actually operate on four points at time. The purpose of the line-writing logic circuit 150 is to fill in those points between the four points $p_{11}$, $p_{12}$, $p_{21}$ and $p_{22}$ in the pattern shown in FIG. 14. This is done by sequentially comparing 'a' or 'b' address of two of the points at a time to determine the direction of the line writing and the magnitude of the increments or steps in the writing of the line between the two points. For example, in comparing points $p_{12}$ and $p_{22}$ in FIG. 14, it is seen that the generation of a line between these two points will require four increments in the a direction and one increment in the b direction. Thus, each step in the generation of points between the points $p_{12}$ and $p_{22}$ will call for the incrementing of one unit in the a direction and ¼ unit in the b direction. Similarly, in writing the line between points $p_{11}$ and $p_{12}$, three unit steps will be taken in the b direction and the increments in the a direction will be $-\frac{1}{3}$. In writing the line between points $p_{11}$ and $p_{21}$, three unit steps will be taken in the a direction and the increments in the b direction will be $-\frac{1}{3}$.

The four points from the column buffer are received and stored in respective registers 301, 302, 303 and 304, as seen in FIG. 15. Thus, the a,b addresses of each of the points $p_{11}$, $p_{12}$, $p_{22}$ and $p_{21}$ are available for processing from the respective registers 301 to 304 for the line-writing operation.

The a and b address values for each of the points $p_{11}$, $p_{12}$, $p_{22}$ and $p_{21}$ are applied to a pair of multiplexers 310 and 311, as seen in FIG. 16. The multiplexers 310 and 311 are controlled by a counter 312 in response to a clock signal $e_q$ to sequentially read out first the a and then the b value of each of the points in a prescribed order. At the first step of operation, the a,b values of point $p_{11}$ will be read out of the multiplexer 310 and applied through an inverter to one input of an adder 315. At the same time, the multiplexer 311 will read out the a,b values of the point $p_{12}$ to the other input of the adder 315. In effect, in view of the presence of the inverter 314 at the output of multiplexer 310, the adder 315 will produce the difference between the values outputted from the multiplexers 310 and 311 and store this difference in a register 316. In the case of the points $p_{11}$ and $p_{12}$, the $\Delta a$ and $\Delta b$ values stored in the register 316 will be one unit and four units, respectively. These increment values will be applied to a PROM 320 which will then supply both the direction of line writing and the $\Delta d$ or increment value for each step of the line writing. In this regard, as noted in connection with FIG. 14, there will always be a unit value in either the a or b direction of line writing and the increment in the other direction will always be a fraction of a unit. Thus, the PROM 320 will provide an output Dir indicating whether the a or b direction is the unit direction and an output $\Delta d$ designating the value of the fraction used for incrementing in the order of these directions.

Figure 17:
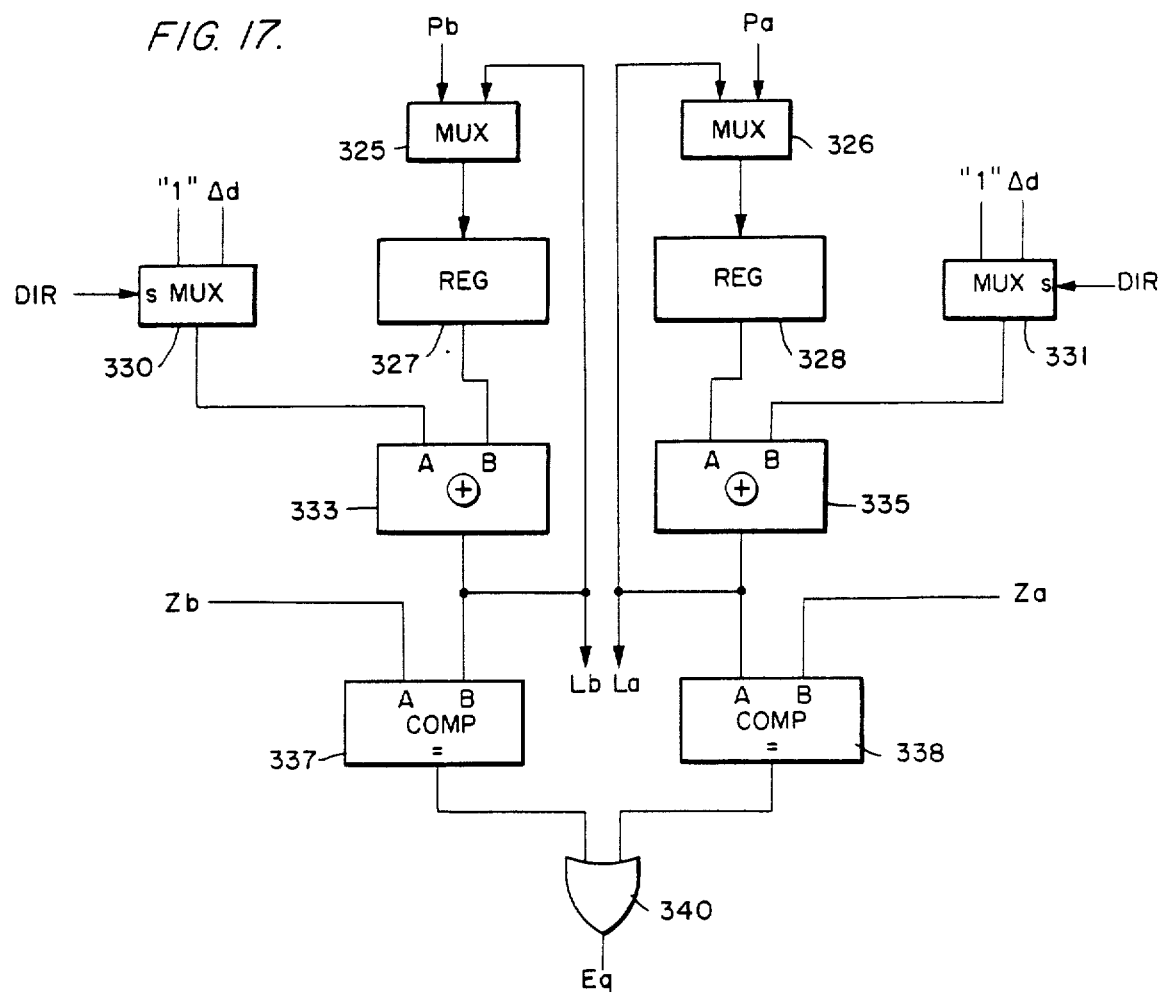

The a and b values $P_a$ and $P_b$ of the point outputted from the multiplexer 310 are applied to respective multiplexers 325 and 326 in FIG. 17. These values are supplied from the multiplexers 325 and 326 to registers 327 and 328, respectively, where the values are stored. The output of the register 327 is applied to one input of an adder 333, the other input of which is connected to the output of a multiplexer 330, which supplies either a unit value or the fraction value $\Delta d$ depending upon the direction of line writing Dir derived from the PROM 320 in FIG. 16. Similarly, the contents of register 328 are applied to one input of an adder 325, the other input of which receives either a unit value or the value $\Delta d$ from a multiplexer 331 depending on the value of the direction of line writing Dir from the PROM 320 in FIG. 16. The output of the adder 335 represents the a value $L_a$ and the output of the adder 333 represents the b value $L_b$ of the point generated along the line. These values are applied back to the multiplexers 326 and 325, respectively, which store the values in the respective registers 328 and 327 for further processing.

Thus, beginning with the initial values $P_a$ and $P_b$, the respective a and b values are successively incremented as they are applied through the two loops comprising multiplexers 325 and 326, registers 327 and 328 and adders 333 and 335. Each cycle through the loop produces an incrementing and the generation of a point along the line from the initial point $P_{a,b}$ to the end point $Z_{a,b}$.

The a and b values of the end point $Z_{a,b}$ are provided from the output of the multiplexer 311 in FIG. 16 to one input of respective comparators 337 and 338 in FIG. 17. The other inputs of the comparators 337 and 338 are the a and b values of $L_a$ and $L_b$ of the points generated along the line from the initial point $P_{a,b}$. The function of the comparators 337 and 338 is to determine when the line has reached the end point, i.e., when the line generation is completed. At this point, an output is provided from the comparators 337 and 338 through the OR gate 340 to produce the clock signal $E_q$. This signal is applied to the counter 312 in FIG. 16 to advance the counter causing the next two points to be processed through the multiplexers 310 and 311. Thus, the points $P_{11}$ and $P_{12}$ will be processed first, then comparison between the points $P_{11}$ and $P_{21}$ will be effected, followed by operation on the points $P_{12}$ and $P_{22}$. When all three of these comparison operations have been completed, the counter 312 will have stepped to its final state producing an output through gate 317 indicating that the processing of lines in conjunction with the four points stored in the registers 301 and 304 in FIG. 15 has been completed. Two new points will then be derived from the column buffer 140 to be processed along with the points $P_{12}$ and $P_{22}$ in the same manner as described in conjunction with FIG. 11e.

As each point is generated in the line writing logic circuit 150, the a and b values $L_a$ and $L_b$ are to be applied to the display write logic 165 for writing into the display memory 170. However, only those values in each vertical column of the display which represents a point located above a preceding point in elevation is to be written into the display memory 170. This is done to suppress the display of hidden points in the perspective scene. For example, as points are transformed from a topographical display to a perspective display by the perspective transform circuit 110, certain areas of the display will fold over due to the elevation thereof, such as the backside surfaces of tall objects, such as mountains. Thus, as one scans upwardly in each vertical column of a display, only those points which are located above previously-scanned points are to be included in the display. If in such vertical scanning, one reaches an elevational ridge line, a certain number of following pixels will represent points on a surface which is folded behind the surface already displayed. These pixels must be suppressed in the display, so that only those pixels which appear above preceding scanned pixels will be included in the final perspective display. Such suppressing of hidden points is effected by the circuit shown in FIG. 18 in conjunction with the column max memory 160.

Figure 18:
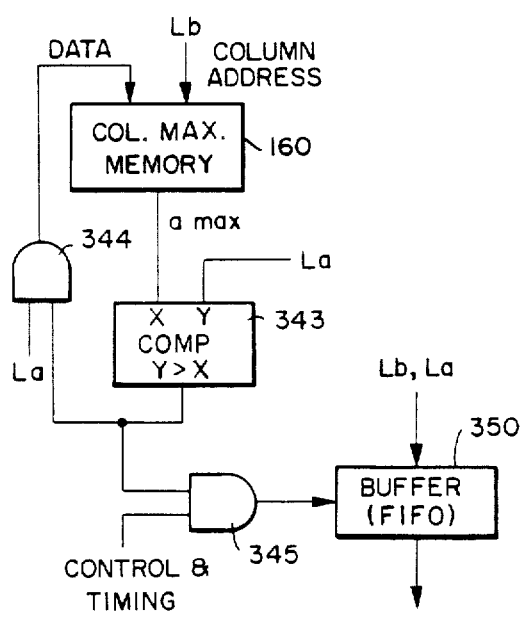

As seen in FIG. 18, the a and b values $L_a$ and $L_b$ of each point generated in the line-writing logic circuit 150 are applied to a FIFO buffer 350 where they are stored in response to the output of gate 345. Thus, the enabling of gate 345 determines whether or not the address of a pixel will be stored in the buffer 350. The gate 345 is controlled on the one hand by a timing clock signal which synchronizes the writing of data into and the reading of data out of the buffer 350 along with the output of a comparator 343. The comparator 343 receives on the one hand the a value $L_a$ of the pixel address and the maximum a value for that particular column in the scene as supplied from the column max memory 160 in response to the b value $L_b$ of the pixel which is supplied as a column address to the memory 160. If the value $L_a$ is greater than the value $a_{max}$ supplied from the memory 160, the comparator will provide an output enabling the gate 345 to effect reading of the pixel address into the buffer 350; whereas, if the a value $L_a$ of the pixel is smaller than the value $a_{max}$ supplied by the memory 160, the gate 345 will remain blocked and the pixel address $L_a$ and $L_b$ will not be stored in the buffer 350 and therefore will not be applied to the display memory 170.

As the comparator 343 produces an output enabling the gate 345 in response to a value $L_a$ which is greater than $a_{max}$, it will also enable a gate 344 to pass that value $L_a$ to the column max memory 160 where it is stored as the new $a_{max}$ value for that column. Thus, the memory 160 will continuously store and supply the highest a value previously processed in connection with each column of the display.

Figure 19:
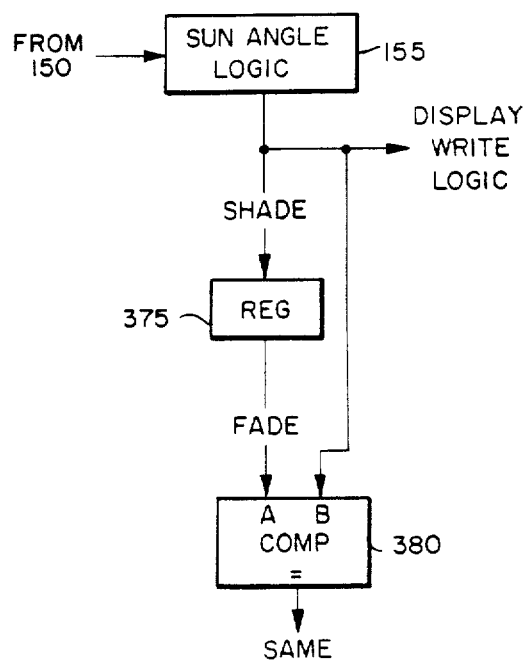

FIG. 19 discloses the general arrangement for processing the elevation values associated with the addresses generated in the circuits of FIGS. 16–18 and includes the sun angle logic circuit 155, which serves to calculate the slope of each point in the display on the basis of the elevation of the block of four points surrounding each particular point. The slope calculated by the logic circuit 155 is applied to a register 375 where it is stored, as well as to one input of a comparator 380. The comparator 380 receives at its other input the content previously stored in the register 375 so as to effect a comparison of the slope of one four-pixel block to the previously-processed four-pixel block. In order to speed up the processing of data, only those pixels are written into the display memory 170 which form the edges representing changes in slope, so that the data appearing in the display memory 170 forms boundary lines defining areas of substantially-equal slope. Thus, when the comparator 380 detects that the slope represented by a four-pixel block is the same as that of the previously-processed four-pixel block, an output is provided to prevent the writing of the current slope data into the display memory at the indicated address by the display write logic circuit 165. This applies only to the line which is common to the previously processed block.

The sun angle logic circuit 155, which serves to control display intensity as a function of slope, will be described more particularly in conjunction with FIGS. 20 and 21. In providing the slope shading feature, the perceived brightness B of the display is controlled in accordance with the following relationship $$B = \frac{\partial f}{\partial x} \sin \psi_s + \frac{\partial f}{\partial y} \cos \psi_s$$

where $\partial f/\partial x$ is the slope of the terrain in the X (East) direction, $\partial f/\partial y$ is the slope of the terrain in the Y (North) direction and $\psi_s$ is the position of the sun relative to North.

Figure 20:
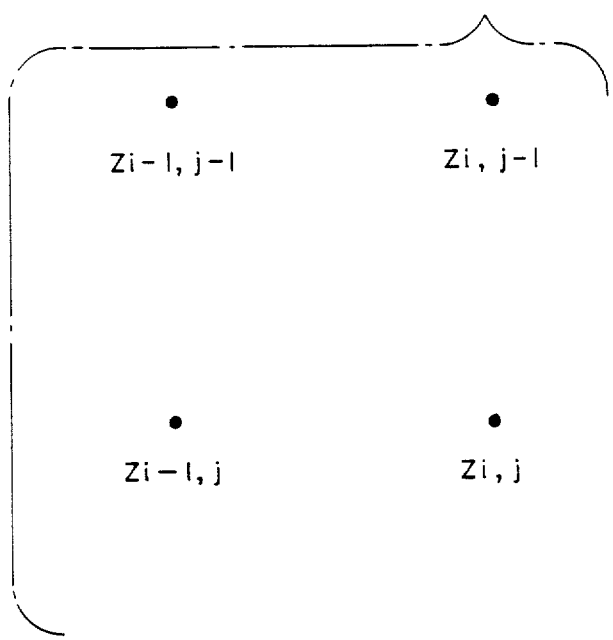
FIG. 20 is a schematic diagram of a block of points for use in explaining the operation of the sun angle logic.

Considering an area comprising a block of four adjacent pixels, as seen in FIG. 20, the determination of slope in the a and b directions can be approximately on the basis of the following relationships:

$$\frac{\partial f}{\partial x} = \tfrac{1}{2}[(Z_{i,j-1} - Z_{i-1,j-1}) + (Z_{i,j} - Z_{i-1,j})]$$

$$\frac{\partial f}{\partial y} = \tfrac{1}{2}[(Z_{i-1,j} - Z_{i-1,j-1}) + (Z_{i,j} - Z_{i,j-1})]$$

Figure 21:
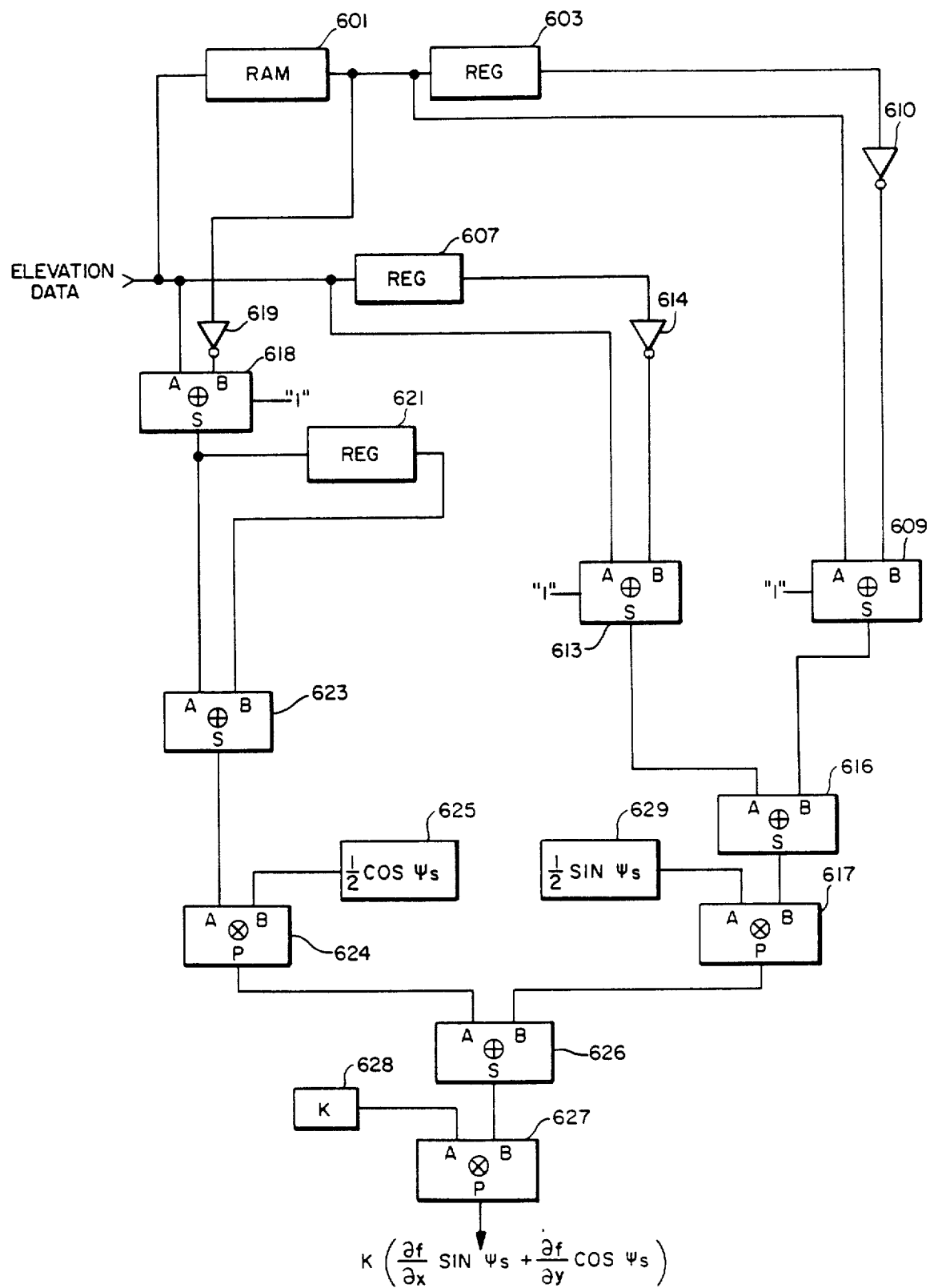
FIG. 21 is a schematic block diagram of the details of the sun angle logic circuit.

The slope shading circuit 60, as seen more particularly in FIG. 21, logically operates on the basis of the foregoing relationship in response to elevation data associated with each pixel.

As seen in FIG. 19, successive values of elevation are supplied to a storage arrangement consisting of RAM 601 and registers 603 and 607, which are connected in correspondence with the pixel pattern of FIG. 20 to receive and store the elevation data for the block of pixels. Thus, adder 609 will receive value $Z_{i,j-1}$ from the RAM 601 and the value $-Z_{i-1,j-1}$ from the register 603 via inverter 610; and, adder 613 will receive the value $Z_{i,j}$ from the circuit input and the value $-Z_{i-1,j}$ from register 607 via inverter 614. The outputs of adders 609 and 613 are summed by adder 616 to produce $2 \cdot (\partial f/\partial x)$. The output of adder 616 is then supplied to one input of a multiplier 617, the other input of which is connected to a PROM 629 providing a signal of value $\tfrac{1}{2} \sin \psi_s$.

The determination of $(\partial f/\partial y)\psi_s$ is obtained by a similar way. Adder 618 will receive the current value of elevation at the input of the circuit and a previous value delayed by one line via inverter 619 from the output of RAM 601. In this way adder 618 produces a first value $Z_{i-1,j} - Z_{i-1,j-1}$ and a second value $Z_{i,j} - Z_{i,j-1}$ in succession as the elevation data is being read into the circuit. The first value is then stored in register 621. The output of register 621 is supplied to one input of an adder 623 which receives the second value at its other input from adder 618 to produce an output signal equal to $2 \cdot (\partial f/\partial y)$. A multiplier 624 receives the output of adder 623 and a signal of value $\tfrac{1}{2} \cos \psi_s$ from PROM 625, and the output of adders 624 and 617 are summed by adder 626. A multiplier 627 then receives the output of adder 626 and a signal value proportional to the inter-pixel spacing K from source 628 to produce a display intensity control signal as a function of slope.

The display write logic 165 receives the successive points from the line-writing logic circuit 150 and effects the writing of this data into the display memory 170, which is provided as a ping-pong memory. In this regard, as one field of data is being written into the display memory 170, the previously-stored field is being read out to the video display. For this purpose, the display memory 170 is provided in the form of two memory units into which data is written under control of the display write logic 165. The reading of data from the display memory 170 is effected, on the other hand, by a read and fill logic circuit 175. As previously indicated only pixels forming the left-facing edges of each four pixel block are written into the display 170. This simplifies the processing of data in that it does not require the storing in the display memory 170 of every pixel of the display. On the other hand, it is necessary at the time of reading the data out of the display memory to the video display to fill in those areas of equal slope as the scanning proceeds. This is accomplished by the read and fill logic circuit 175, which is shown in more detail in FIG. 22.

Figure 22:
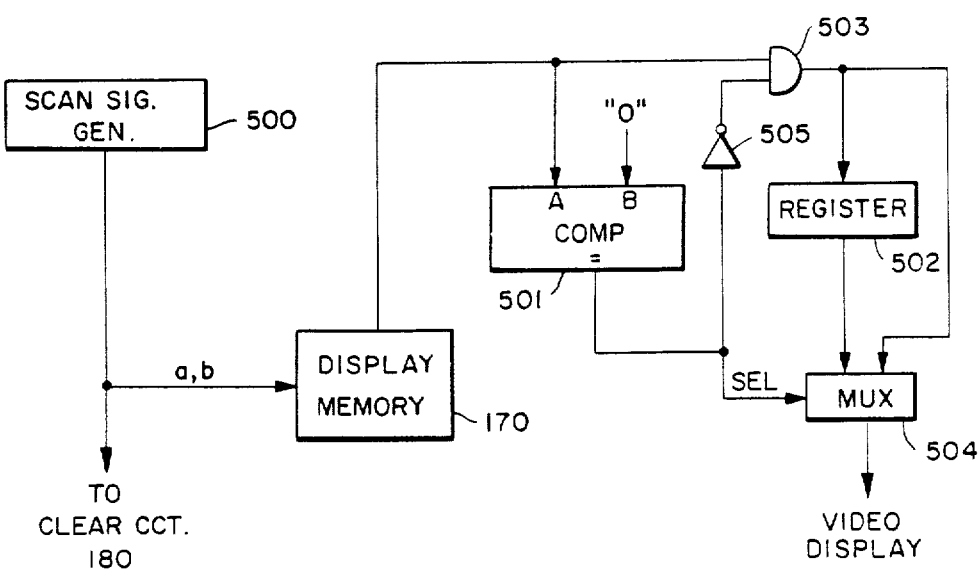
FIG. 22 is a schematic diagram of the read and fill logic circuit.

As seen in FIG. 22, a scan signal generator 500 generates the display memory addresses a,b which are sequentially applied to the memory 170 to effect a left-to-right and bottom-to-top reading of the data therein. The data read out of the display memory 170 is applied to one input of a comparator 501, the other input of which receives a zero value. The comparator 501 basically determines whether the data read from the display memory 170 is an intensity control signal or is a zero value forming an area between the boundary lines of data stored in the memory. If the data read out of the display memory 170 represents an intensity control value, the comparator will produce a noncomparison output which will be applied through an inverter 505 to enable gate 503 to pass that value for storage in a register 502. At the same time, the output of the gate 503 is also applied to the video display via MUX 504. On the other hand, if the output of the display memory 170 is a zero value, the comparator will produce an output to enable the MUX 504 to apply to the video display the previous value stored in the register 302 rather than the output of gate 503. Under these conditions, the gate 503 remains inhibited. Thus, the content of the register 502 will be read out successively until a new intensity control value is supplied from the memory 170, at which time that value will be stored in the register 502 as the new value to be supplied to the video display.

Figure 23:
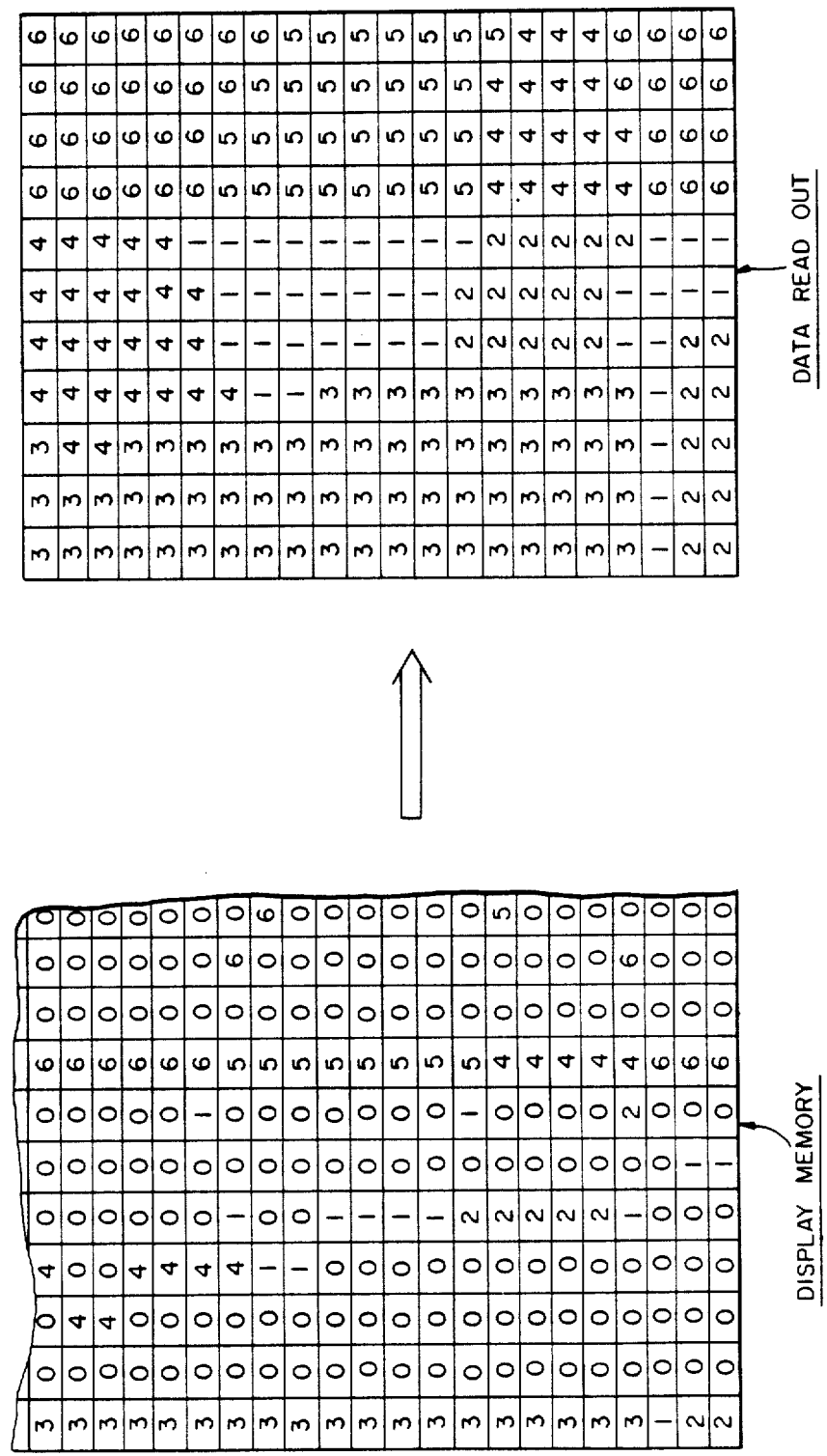
FIG. 23 is a schematic diagram showing an example of the data stored in a portion of the display memory.

As seen in FIG. 23, which illustrates diagrammatically a portion of the display memory with an example of lines of data stored therein, in scanning from left-to-right through the memory, as an intensity value represented by a number other than zero is encountered in any given storage location, that intensity value will be stored in the register 502 of the read and fill logic circuit 175, as seen in FIG. 22. Where a zero value is read out of a storage area from an area of the memory 170 between contour lines, the previously-stored value in the register 502 will be supplied to the video display. Thus, the read and fill logic circuit 175 serves to read data from the display memory and fill in those pixels between the boundary lines of data stored in the display memory 175.

The clear circuit 180 responds to the output of scan generator 500 in the logic circuit 175 to clear the display memory 170 as data is read therefrom. Thus, when writing of data into any display unit of the display memory 170 begins, that memory unit will be completely clear, having been cleared during the previous read operation.

It can therefore be seen that the present invention provides a perspective processor which is capable of reading data from a scene memory in which the data is stored in accordance with the position of each pixel in a topographical representation of the terrain and converting that data so that each pixel occupies a proper position in a perspective representation of that same terrain. In addition, the perspective transformation takes into account the heading, elevation and angle of view so that a real-time display of terrain in perspective is provided.

While we have shown and described several embodiments in accordance with the present invention, it is understood that the same is not limited thereto but is susceptible of numerous changes and modifications as known to one of ordinary skill in the art, and we therefore do not wish to be limited to the details shown and described herein but intend to cover all such changes and modifications obvious to those skilled in the art.

What is claimed is:

1. A digital information storage and read-out system for use in a system producing a perspective display, comprising:
   memory means for storing digital data representing a two-dimensional pattern of elevation information in addressable memory locations;
   means for generating signals representing the parameters of the desired perspective display including the height and location of the viewing point and the angle of the display with respect to the two-dimensional patterns;
   read-out control means for reading elevation data out of said memory means from selected addressable memory locations through generation of address signals and application of said address signals to said memory means; and
   perspective transform means, responsive to said signal generating means, for transforming the address of each elevation data read out of said memory means from the address of that point in the two-dimensional pattern to the address of a respective pixel position in the perspective display.

2. A digital information storage and read-out system according to claim 1, wherein said digital data is stored in said memory means with said pattern having a fixed orientation, said read-out control means including means for selectively generating said address signals so as to read out pattern information in a direction which may be selectively different from said fixed orientation.

3. A digital information storage and read-out system according to claim 2, wherein said perspective transform means includes means for generating a signal $\Delta E$ representing the difference in height between the viewing point of the perspective display and each elevation point in said elevation pattern, means for generating a signal R representing the distance parallel to said fixed orientation between each elevation point and the viewing point in said two-dimensional elevational pattern, and means for generating a signal $\Delta W$ representing the distance between each elevation point and a line through the viewing point parallel to said fixed orientation.

4. A digital information storage and read-out system according to claim 3, wherein said perspective transform means further includes means for generating transformed addresses a,b for each pixel according to the relationship:

$$a = K\left(\frac{\Delta E \sin\alpha - R\cos\alpha}{\Delta E \cos\alpha - R\sin\alpha}\right) \text{ and}$$

$$b = K\left(\frac{\Delta W}{\Delta E \cos\alpha + R\sin\alpha}\right)$$

where $\alpha$ is the angle of the perspective display with respect to said two-dimensional elevational pattern and K is a constant.

5. A digital information storage and read-out system for use in generating a perspective display of terrain over which a vehicle is moving on the basis of digital data representing a two-dimensional elevation terrain pattern which is addressable in relation to the coordinate position of each point in said terrain pattern, comprising:
   a scene memory for storing said elevation data representing at least a portion of the terrain pattern of the terrain over which the vehicle is passing;
   signal supplying means for providing signals representing the angle of heading of said vehicle with respect to a fixed geographical orientation, the angle of the perspective display with respect to said two-dimensional elevation terrain pattern, and the elevation and current position of said vehicle with respect to said terrain;
   read-out control means responsive to the signals from said signal supplying means for reading elevation data out of said scene memory through generation of address signals and the application of said address signals to said scene memory; and
   perspective transform means responsive to the signals from said signal supplying means for transforming the address of each point read out of said scene memory from the address of the point in the two-dimensional terrain pattern to the address of a respective pixel position in said perspective display.

6. A digital information storage and read-out system according to claim 5, wherein said perspective transform means includes means for generating a signal ΔE representing the difference in elevation between the vehicle and each elevation point in said terrain pattern, means for generating a signal R representing the distance parallel to the vehicle heading between each elevation point position and the vehicle position in said terrain pattern, and means for generating a signal W representing the distance between each elevation point and a line through the vehicle position parallel to the vehicle heading in said terrain pattern.

7. A digital information storage and read-out system according to claim 6, wherein said perspective transform means includes further means for generating transformed addresses a,b for each point according to the relationships $$a = K\left(\frac{\Delta E \sin\alpha - R\cos\alpha}{\Delta E \cos\alpha - R\sin\alpha}\right) \text{ and } b = K\left(\frac{\Delta W}{E\cos\alpha + R\sin\alpha}\right)$$

where α is the angle of the perspective display with respect to said two-dimensional elevational terrain pattern and K is a constant.

8. A digital information storage and read-out system according to claim 5, wherein said terrain pattern of data is stored in said scene memory with a fixed geographical orientation, and said read-out means includes means for selectively generating said address signals so as to read out pattern information in a direction which may be selectively different from said fixed geographical orientation.

9. A digital information storage and read-out system according to claim 5, wherein said terrain pattern of data is stored in said scene memory with a north-up orientation, and wherein said read-out means includes means for selectively generating said address signals so as to scan said elevation data in said scene memory either in a north-south or an east-west direction depending on which is closest to the direction of heading of the vehicle with respect to said terrain.

10. A digital information storage and read-out system according to claim 5, wherein said read-out means includes means for selectively generating said address signals so as to scan an area of said scene memory in successive lines which extend from a line through the point position corresponding to the position of the vehicle in the general direction of heading of the vehicle with respect to the terrain.

11. A digital information storage and read-out system according to claim 5, wherein said read-out means includes means for selectively generating said address signals so as to scan a generally diamond-shaped area of said scene memory, said area being positioned within said scene memory with one edge thereof being substantially transverse to the direction of vehicle heading with respect to said terrain pattern and the scanning of said area being in the direction parallel or transverse to the geographical orientation of said data in the scene memory, whichever makes the smallest angle with said vehicle heading.

12. A system for generating a perspective display of terrain over which a vehicle is moving, comprising:
a scene memory for storing digital data representing a two-dimensional elevation terrain pattern which is addressable in relation to the coordinate position of each elevation point with respect to a selected geographical orientation, signal supplying means for providing signals representing the heading angle of said vehicle with respect to said selected geographical orientation, the angle of the desired perspective display with respect to said two-dimensional elevation terrain pattern, and the elevation and current position of said vehicle with respect to said terrain;

read-out control means, responsive to the signals from said signal supplying means, for reading elevation data for respective ones of said elevation points out of said scene memory through generation of address signals and the application of said address signals to said scene memory;

perspective transform means responsive to the signals from said signal supplying means for transforming the address of each point read out of said scene memory from the address of that point in the scene memory to the address of a respective pixel position in said perspective display;

display memory means for storing the elevation data read out of said scene memory in a matrix of memory positions forming storage locations corresponding to said transformed addresses; and display means for displaying the elevation data stored in said display memory means to produce said perspective display.

13. A system according to claim 12, further including buffer storage means for storing the data read out of said scene memory including the transformed address of each elevation in storage locations corresponding to the storage locations occupied by said elevation data in said scene memory; and means for transferring said data from said buffer storage means to storage locations in said display memory means in accordance with said transformed address.

14. A system according to claim 12, wherein said read-out means includes means for selectively generating said address signals so as to scan a generally diamond-shaped area of said scene memory along lines substantially parallel or transverse to said selected geographical orientation depending on which makes the smallest angle with the vehicle heading, said area being positioned within said scene memory with one edge thereof transferse to said vehicle heading.

15. A system according to claim 13, wherein said read-out means includes means for selectively generating said address signals so as to scan a generally diamond-shaped area of said scene memory along parallel lines substantially in the direction of the heading of the vehicle.

16. A system according to claim 15, wherein said buffer storage means includes a column buffer memory having a plurality of columns for storing respective lines of data read out of said scene memory by said read-out means in positions corresponding to the locations of said data in said scene memory.

17. A system according to claim 16, wherein each column in said column buffer memory has a capacity to store data associated with at least the number of points which occupy the diagonal of said generally diamond-shaped scan area of said scene memory, and further including start/stop means for storing the address location for each column of said column buffer memory at which data begins and ends and means responsive to said start/stop means for reading plural data from adjacent columns of said column buffer memory.

18. A system according to claim 16, wherein said transferring means includes buffer control means for reading out plural data including the transformed addresses thereof in groups from adjacent columns of said column buffer memory by scanning said columns, line writing logic means responsive to the data read out of said column buffer memory for generating additional elevation data representing occupying positions extending along lines between the data points of each group in accordance with the transformed addresses thereof, and means for transmitting said data and said additional data in said display memory means.

19. A system according to claim 16, wherein said transferring means includes inhibiting means responsive to the elevation data of each pixel to be transferred to said display memory means for inhibiting such transfer in connection with any pixel along a given column in said matrix of memory positions of said display memory means which has an elevational value which is less than the elevation value of a pixel from the same column which has already been transferred to said display memory means.

20. A system according to claim 19, wherein said inhibiting means includes a column max memory for storing an elevation value for each column of data stored in said display memory means, means for comparing the elevation value for each point read out of said column buffer memory and for each point generated by said line writing logic means with the elevation value stored in the column max memory for that column in which the data is to be written into said display memory means, means responsive to said comparing means for storing in the column max memory the elevation value of the point when that value is greater than the value previously stored and for inhibiting transfer of said data to said display memory means when the elevation value thereof is less than that previously stored.

21. A system according to claim 18, wherein said line writing logic means includes storing means for storing the transformed addresses of two adjacent points, means for increment one of said addresses in first and second coordinate directions toward said other address by calculated stepping values, means for generating an additional data value at each incremented step taken by said incrementing means, and means for controlling said buffer control means to store the transformed addresses of the next points read out of said column buffer memory into said storing means when the one address has been incremented until it corresponds to said other address.

22. A system according to claim 21, wherein said storing means stores the transformed addresses of four adjacent points read out of said column buffer memory, and said incrementing means includes means to compare said addresses in predetermined combinations of pairs, and means to increment said addresses in said predetermined combinations of pairs only when said comparison thereof indicates that the one address of the pair has a selected relationship to the other address.

23. A system according to claim 22, wherein said comparing means includes means for determining whether the line extending between the pair of points will face in a predetermined direction with respect to the orientation of data in said display memory means.

24. A system according to claim 13, wherein said transferring means includes means for writing into said display memory means along successive scanning lines only those data values which represent a different value of slope from the previous data value stored in said display memory means on the same scanning line.

25. A system according to claim 24, wherein said display means includes means for reading pixel data out of said display memory means, including means for generating pixels for storage locations containing zero information in accordance with the value of the last pixel read out along the same scanning line.

26. A system according to claim 25, wherein said display memory means includes first and second display memories, and means for writing pixel data into one of said first and second display memories while pixel data is being read out of the other.

27. A digital information storage and read-out system for use in generating a real-time perspective display of terrain over which a vehicle is moving on the basis of stored digital data representing a two-dimensional elevational terrain pattern and signals indicating the instantaneous heading, geographic location and elevation of the vehicle and the desired angle of view of the resultant perspective display, comprising
a scene memory for storing said digital data in addressable coordinate positions relating to a selected geographic orientation of the terrain;
read-out control means responsive to said signals representing heading, geographic location and angle of view for reading data out of said scene memory through generation of address signals to address a selected area of said scene memory on the basis of the heading and geographic location of the vehicle and the desired angle of view with respect to the terrain represented by said digital data;
perspective transform means responsive to the signals representing heading, elevation, geographic location and angle of view for transforming the address of each data value read out of said scene memory from the address of its associated point in the two-dimensional terrain pattern to the address of a respective pixel in said perspective display; and
display means responsive to the addresses generated by said perspective transform means for generating a real-time perspective display of said terrain.

28. A system according to claim 27, wherein said perspective transform means includes means for varying said transformed addresses in response to selected variations in the signal representing the desired angle of view.

29. A system according to claim 27, wherein said perspective transform means includes means for generating a signal $\Delta E$ representing the difference in elevation between the vehicle and each point in said terrain pattern, means for generating a signal R representing the distance parallel to the vehicle heading between each point position and the vehicle position in said terrain pattern, and means for generating a signal $\Delta W$ representing the distance between each point and a line through the vehicle position parallel to the vehicle heading in said terrain pattern.

30. A system according to claim 29, wherein said digital data stored in said scene memory represents for each point in the terrain an elevation value $E_i$ equal to the actual elevation of that point reduced by a base elevation $E_b$, and said means for generating the signal $\Delta E$ includes first means for multiplying the elevation value $E_i$ read from said scene memory by a scale factor $S_f$ and for adding to the result of said multiplication the base elevation $E_b$ and second means for subtracting the output of said first means from the signal representing the elevation of said vehicle.

31. A system according to claim 29, wherein said perspective transform means includes further means for generating transformed addresses a,b for each point according to the relationships $$A = K\left(\frac{\Delta E \sin\alpha - R\cos\alpha}{\Delta E \cos\alpha - R\sin\alpha}\right) \text{ and}$$

$$b = K\left(\frac{\Delta W}{\Delta E \cos\alpha + R\sin\alpha}\right)$$

where is the desired angle of view with respect to the horizontal and K is a constant.

32. A digital information storage and read-out system according to claim 27, wherein said read-out means includes means for selectively generating said address signals so as to scan a generally diamond-shaped area of said scene memory, said area being positioned within said scene memory with one edge thereof being substantially transverse to the direction of vehicle heading with respect to said terrain pattern and the scanning of said area being in the direction parallel or transverse to the geographical orientation of said data in the scene memory, whichever makes the smallest angle with said vehicle heading.

33. A system according to claim 27, wherein said display means includes a column buffer memory having a plurality of columns for storing respective lines of data, including both elevation data and the transformed address of each point read out of said scene memory by said read-out means, in positions corresponding to the locations of said points in said scene memory; line writing logic means responsive to groups of the data read out of said column buffer memory for generating additional data representing the elevation and addresses of points extending along lines between the points of each group in accordance with the transformed address thereof; and display memory means for storing the elevation data of points processed by said line writing logic means and points read out of said column buffer memory at locations corresponding to the transformed addresses of said points.

34. A system according to claim 33, wherein said display means further includes transferring means for transferring data from said line writing logic means into said display memory means by scanning said display memory means in successive lines beginning with pixel data representing the bottom of the display, the storage locations in each line of pixel data in the display memory means forming columns with the corresponding positions in the other lines.

35. A system according to claim 34, wherein said transferring means includes inhibiting means responsive to the elevational data of each point to be transferred to said display memory means for inhibiting such transfer in connection with any pixel along a given column of said display memory means which has an elevational value which is less than the elevational value of a pixel of the same column which has already been transferred to said display memory means.

36. A system according to claim 35, wherein said inhibiting means includes a column max memory for storing an elevation value for each column of data stored in said display memory means, means for comparing the elevation value for each point read out of said column buffer memory and for each point generated by said line writing logic means with the elevation value stored in the column max memory for that column in which the pixel is to be written into said display memory means, means responsive to said comparing means for storing the column max memory the elevation value of the pixel when that value is greater than the value previously stored and for inhibiting transfer of said pixel value to said display memory means when the elevation value thereof is less than that previously stored.

37. A system according to claim 33, wherein said line writing logic means includes storing means for storing the transformed addresses of two adjacent points, means for incrementing one of said addresses in first and second coordinate directions toward said other address by calculated stepping values, means for generating an additional data value at each incremented step taken by said incrementing means, and means for controlling said buffer control means to store the transformed addresses of the next points read out of said column buffer memory into said storing means when the one address has been incremented until it corresponds to said other address.

38. A system according to claim 37, wherein said storing means stores the transformed addresses of four adjacent points read out of said column buffer memory, and said incrementing means includes means to compare said addresses in predetermined combinations of pairs, and means to increment said addresses in said predetermined combinations of pairs only when said comparison thereof indicates that the one address of the pair has a selected relationship to the other address.

39. A system according to claim 38, wherein said comparing means includes means for determining whether the line extending between the pair of points will face in a predetermined direction with respect to the orientation of data in said display memory means.

40. A system according to claim 33, wherein said display means further includes sun angle logic means for generating, with respect to each data value read out of said column buffer memory and each data value generated by said line writing logic means, the slope at the point of the terrain represented by that data value on the basis of the data values around that point, and transferring means for transferring said slope data into said display memory means at addresses provided by said line writing logic means in successive lines.

41. A system according to claim 40, wherein said sun angle logic means includes means for comparing each value of slope which is generated with the slope value previously generated for the preceeding point, and inhibiting means responsive to said comparing means for controlling said transferring means to store in said display memory means only that data which represents a change in slope on a given scanning line in said display memory.

42. A system according to claim 41, wherein said display means includes means for reading pixel data out of said display memory means, including means for generating pixels for storage locations containing zeros in accordance with the value of the last non-zero pixel read out along the same scanning line.

* * * * *